(12) United States Patent
Koiso et al.

(10) Patent No.: US 11,923,803 B2
(45) Date of Patent: Mar. 5, 2024

(54) ANOMALY FACTOR DIAGNOSIS APPARATUS AND METHOD, AND ANOMALY FACTOR DIAGNOSIS SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Takashi Koiso, Kawasaki (JP); Hiroshi Mizuno, Ota (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/015,530

(22) Filed: Sep. 9, 2020

(65) Prior Publication Data
US 2020/0412298 A1 Dec. 31, 2020

Related U.S. Application Data

(63) Continuation of application No. PCT/JP2019/000972, filed on Jan. 15, 2019.

(51) Int. Cl.
*H02S 50/00* (2014.01)
(52) U.S. Cl.
CPC .................................. *H02S 50/00* (2013.01)
(58) Field of Classification Search
None
See application file for complete search history.

(56) References Cited

U.S. PATENT DOCUMENTS 8,682,824 B2 3/2014 Shibuya et al.
2009/0000659 A1 1/2009 Hasegawa et al.
(Continued)

FOREIGN PATENT DOCUMENTS

JP 7-280603 A 10/1995
JP 2007-311487 A 11/2007
(Continued)

OTHER PUBLICATIONS

Espacenet machine translation, Hattori Reiko, "Factor Estimation Device, Control Method of Factor Estimation Device, Control Program and Record Medium," JP2017169321A, Sep. 21, 2017. (Year: 2017).*

(Continued)

*Primary Examiner* — Michael J Dalbo
*Assistant Examiner* — Denise R Karavias
(74) *Attorney, Agent, or Firm* — Oblon, McClelland, Maier & Neustadt, L.L.P.

(57) ABSTRACT

According to one embodiment, an anomaly factor diagnosis apparatus includes an identifier configured to identify a first measurement data item corresponding to a first time point when an anomaly factor occurs in a power generation apparatus, among measurement data items in the power generation apparatus, based on anomaly factor occurrence data identifying the first time point; a distribution generator configured to calculate a first distribution function representing a distribution of a feature value of the first measurement data item; and an evaluator configured to calculate an evaluation value of possibility of occurrence of the anomaly factor in the power generation apparatus, based on the first distribution function, and measurement data items to be tested in the power generation apparatus.

13 Claims, 24 Drawing Sheets

(56) References Cited

U.S. PATENT DOCUMENTS

| | | | |
|---|---|---|---|
| 2012/0290879 A1 | 11/2012 | Shibuya et al. | |
| 2012/0310427 A1* | 12/2012 | Williams | G05B 23/0218 702/182 |
| 2014/0175260 A1* | 6/2014 | Futakuchi | F24S 50/20 136/246 |
| 2016/0019323 A1* | 1/2016 | Tsuruta | H01L 31/02021 703/18 |
| 2016/0370432 A1* | 12/2016 | Sakuma | G01R 31/3865 |
| 2018/0366979 A1* | 12/2018 | Granger | G05B 15/02 |
| 2019/0273466 A1* | 9/2019 | Gostein | H02S 50/00 |
| 2021/0140851 A1* | 5/2021 | Kim | G01H 13/00 |

FOREIGN PATENT DOCUMENTS

| | | |
|---|---|---|
| JP | 2014-49706 A | 3/2014 |
| JP | 2014-59910 A | 4/2014 |
| JP | 2017-169321 A | 9/2017 |
| JP | 2018-95429 A | 6/2018 |
| KR | 10-1775065 B1 | 9/2017 |
| WO | WO 2016/166991 A1 | 10/2016 |
| WO | WO 2017/169473 A1 | 10/2017 |

OTHER PUBLICATIONS

Espacenet machine translation, Inuduka Tatsuki, et al., "Device for Estimating state of Power Grid, State Estimation Method Thereof, and Power Grid Control System," WO2015079554A1, Jun. 4, 2015. (Year: 2017).*

Vladimir Artioukh, "How and Where Can You Store Data For a Long Time?" Oct. 24, 2016, Hetman Software, downloaded from https://hetmanrecovery.com/recovery_news/how-and-where-can-you-store-data-for-a-long-time.htm on Sep. 13, 2022 (Year: 2016).*

International Search Report dated Mar. 5, 2019 in PCT/JP2019/000972 filed Jan. 15, 2019, 2 pages.

Zhao, Y. et al., "Decision Tree-Based Fault Detection and Classification in Solar Photovoltaic Arrays," Twenty-Seventh Annual IEEE Applied Power Electronics Conference and Exposition, 2012, 7 pages.

Triki-Lahiani, A. et al., "Fault detection and monitoring systems for photovoltaic installations: A review," Renewable and Sustainable Energy Reviews, vol. 82, 2018, 13 pages.

* cited by examiner

| TIME POINT | SOLAR IRRADIANCE | AIR TEMPERATURE | PCS_ID | VOLTAGE | CURRENT | POWER |
|---|---|---|---|---|---|---|
| ... | ... | ... | ... | ... | ... | ... |
| 2017/10/16/ 9:24 | 103 | 14.7 | PCS-01 | 596.24 | 4.504 | 2.633 |
| 2017/10/16/ 9:25 | 108 | 14.7 | PCS-01 | 596.67 | 4.773 | 2.775 |
| 2017/10/16/ 9:26 | 114 | 14.7 | PCS-01 | 598.01 | 4.989 | 2.911 |
| 2017/10/16/ 9:27 | 121 | 14.8 | PCS-01 | 602.73 | 5.238 | 3.074 |
| 2017/10/16/ 9:28 | 129 | 14.8 | PCS-01 | 602.29 | 5.59 | 3.281 |
| ... | ... | ... | ... | ... | ... | ... |

FIG. 3

| PCS_ID | TIME POINT | ROD-SHAPED SHADOW | ARRAY CONTAMINATION |
|---|---|---|---|
| ... | ... | ... | ... |
| PCS-01 | 2017/10/10/10/ 10:10 | ABSENT | ABSENT |
| PCS-01 | 2017/10/10/10/ 10:11 | ABSENT | ABSENT |
| PCS-01 | 2017/10/10/10/ 10:12 | ABSENT | ABSENT |
| PCS-01 | 2017/10/10/10/ 10:13 | ABSENT | ABSENT |
| ... | ... | ... | ... |
| PCS-02 | 2017/10/10/10/ 08:21 | PRESENT | ABSENT |
| PCS-02 | 2017/10/10/10/ 08:22 | PRESENT | ABSENT |
| PCS-02 | 2017/10/10/10/ 08:23 | PRESENT | ABSENT |
| PCS-02 | 2017/10/10/10/ 08:24 | PRESENT | ABSENT |
| ... | ... | ... | ... |
| PCS-03 | 2017/10/10/10/ 08:03 | ABSENT | PRESENT |
| PCS-03 | 2017/10/10/10/ 08:04 | ABSENT | PRESENT |
| PCS-03 | 2017/10/10/10/ 08:05 | ABSENT | PRESENT |
| PCS-03 | 2017/10/10/10/ 08:06 | ABSENT | PRESENT |
| ... | ... | ... | ... |

FIG. 4

| PCS ID | YEAR | MONTH | DAY | EVALUATION VALUE OF POSSIBILITY OF ROD-SHAPED SHADOW OCCURRENCE | | THRESHOLD=0.7 |
|--------|------|-------|-----|---|---|---|
| PCS_01 | 2017 | 10 | 25 | 0.925 | → | CONFIRMATION REQUIRED |
| PCS_12 | 2017 | 10 | 25 | 0.919 | → | CONFIRMATION REQUIRED |
| PCS_06 | 2017 | 10 | 26 | 0.892 | → | CONFIRMATION REQUIRED |
| PCS_06 | 2017 | 10 | 25 | 0.886 | → | CONFIRMATION REQUIRED |
| PCS_01 | 2017 | 10 | 26 | 0.884 | → | CONFIRMATION REQUIRED |
| PCS_04 | 2017 | 10 | 25 | 0.881 | → | CONFIRMATION REQUIRED |
| PCS_08 | 2017 | 10 | 26 | 0.705 | → | CONFIRMATION REQUIRED |
| PCS_04 | 2017 | 10 | 26 | 0.704 | → | CONFIRMATION REQUIRED |
| PCS_06 | 2017 | 10 | 20 | 0.701 | → | CONFIRMATION REQUIRED |
| PCS_01 | 2017 | 10 | 20 | 0.698 | → | GOOD |
| PCS_09 | 2017 | 10 | 26 | 0.670 | → | GOOD |
| PCS_02 | 2017 | 10 | 27 | 0.665 | → | GOOD |
| PCS_06 | 2017 | 10 | 24 | 0.659 | → | GOOD |
| PCS_01 | 2017 | 10 | 24 | 0.651 | → | GOOD |
| PCS_09 | 2017 | 10 | 23 | 0.625 | → | GOOD |
| PCS_22 | 2017 | 10 | 23 | 0.625 | → | GOOD |
| PCS_01 | 2017 | 10 | 23 | 0.624 | → | GOOD |

FIG. 11

| PCS ID | YEAR | MONTH | DAY | EVALUATION VALUE OF POSSIBILITY OF ARRAY CONTAMINATION OCCURRENCE |
|---|---|---|---|---|
| PCS_04 | 2017 | 10 | 25 | 0.812 |
| PCS_06 | 2017 | 10 | 26 | 0.698 |
| PCS_08 | 2017 | 10 | 26 | 0.688 |
| PCS_09 | 2017 | 10 | 25 | 0.647 |
| PCS_04 | 2017 | 10 | 26 | 0.608 |
| PCS_12 | 2017 | 10 | 26 | 0.572 |
| PCS_09 | 2017 | 10 | 26 | 0.567 |
| PCS_22 | 2017 | 10 | 27 | 0.559 |
| PCS_01 | 2017 | 10 | 26 | 0.542 |
| PCS_15 | 2017 | 10 | 27 | 0.508 |
| PCS_09 | 2017 | 10 | 27 | 0.428 |
| PCS_19 | 2017 | 10 | 27 | 0.372 |
| PCS_08 | 2017 | 10 | 27 | 0.367 |
| PCS_04 | 2017 | 10 | 27 | 0.364 |
| PCS_06 | 2017 | 10 | 25 | 0.364 |
| PCS_01 | 2017 | 10 | 27 | 0.351 |
| PCS_06 | 2017 | 10 | 27 | 0.346 |

THRESHOLD = 0.6

| |
|---|
| CONFIRMATION REQUIRED |
| CONFIRMATION REQUIRED |
| CONFIRMATION REQUIRED |
| CONFIRMATION REQUIRED |
| CONFIRMATION REQUIRED |
| GOOD |
| GOOD |
| GOOD |
| GOOD |
| GOOD |
| GOOD |
| GOOD |
| GOOD |
| GOOD |
| GOOD |
| GOOD |
| GOOD |

FIG. 12

SOLAR IRRADIANCE : 0.7 OR HIGHER

TRAINING DATA TARGET PERIOD : 2018/07/01 ~ 2018/08/31

TRAINING DATA TARGET CULMINATION ALTITUDE : 44 ~ 54 DEGREES

TEST DATA TARGET PERIOD : 2019/07/01 ~ 2019/07/31

UNIT TIME INTERVAL :
(SCORE COUNTING TIME INTERVAL) 60 MINUTES   EVALUATION TIME SLOT : 10:00 ~ 16:00

FIG. 13

FOR SIMULATION

| PCS_ID | TIME POINT | ROD-SHAPED SHADOW |
|---|---|---|
| ... | ... | ... |
| PCS-01 | STP00001 | PRESENT |
| PCS-01 | STP00002 | PRESENT |
| ... | ... | ... |

FIG. 17

| TIME POINT | SOLAR IRRADIATION | AIR TEMPERATURE | PCS_ID | VOLTAGE | CURRENT | POWER |
|---|---|---|---|---|---|---|
| ... | ... | ... | ... | ... | ... | ... |
| 2017/10/16/9:24 | 103 | 14.7 | PCS01 | 596.24 | 4.504 | 2.633 |
| 2017/10/16/9:25 | 108 | 14.7 | PCS01 | 596.67 | 4.773 | 2.775 |
| 2017/10/16/9:26 | 114 | 14.7 | PCS01 | 598.01 | 4.989 | 2.911 |
| 2017/10/16/9:27 | 121 | 14.8 | PCS01 | 602.73 | 5.238 | 3.074 |
| 2017/10/16/9:28 | 129 | 14.8 | PCS01 | 602.29 | 5.59 | 3.281 |
| ... | ... | ... | ... | ... | ... | ... |
| STP00001 | 133 | 18.7 | PCS01 | — | — | 4.323 (CORRECTED VALUE) |
| STP00002 | 128 | 17.7 | PCS01 | — | — | 4.012 (CORRECTED VALUE) |
| ... | ... | ... | ... | ... | ... | ... |

Rows 2017/10/16/9:24 – 2017/10/16/9:28: ACTUAL MEASUREMENT DATA
Rows STP00001 – STP00002: SIMULATION DATA

FIG. 19

SIMULATION TARGET PERIOD : 2018/07/01 ~ 2018/08/31

SIMULATION TARGET CULMINATION ALTITUDE : 44 ~ 54 DEGREES

UNIT TIME INTERVAL :
(SCORE COUNTING TIME INTERVAL) 60 MINUTES   EVALUATION TIME SLOT : 10:00 ~ 16:00

USE OF SIMULATION DATA :   ☑ YES   ☐ NO

FIG. 20

| | | |
|---|---|---|
| SOLAR IRRADIANCE : | 0.7 | OR HIGHER |
| TRAINING DATA TARGET PERIOD : | 2018/07/01 ~ 2018/08/31 | |
| TRAINING DATA TARGET CULMINATION ALTITUDE : | 44 ~ 54 | DEGREES |
| TEST DATA TARGET PERIOD : | 2019/07/01 ~ 2019/07/31 | |
| SIMULATION TARGET PERIOD : | 2018/07/01 ~ 2018/08/31 | |
| SIMULATION TARGET CULMINATION ALTITUDE : | 44 ~ 54 | DEGREES |
| UNIT TIME INTERVAL : (SCORE COUNTING TIME INTERVAL) | 60 MINUTES   EVALUATION TIME SLOT : 10:00 ~ 16:00 | |
| USE OF SIMULATION DATA : | ☑ YES   ☐ NO | |

FIG. 21

ANOMALY FACTOR DIAGNOSIS APPARATUS AND METHOD, AND ANOMALY FACTOR DIAGNOSIS SYSTEM

CROSS REFERENCE TO RELATED APPLICATIONS

This application is a Continuation of International Application No. PCT/JP2019/000972, filed on Jan. 15, 2019, the entire contents of which is hereby incorporated by reference.

FIELD

Embodiments of the present invention relate to an anomaly factor diagnosis apparatus and method, and an anomaly factor diagnosis system.

BACKGROUND

In recent years, solar photovoltaic generation systems each mounted with many (for example, 1000 or more) solar photovoltaic generation modules (PV panels) have been installed in large premises (for example, 1 ha or more each). In such a solar photovoltaic generation system, the generation capacity sometimes falls below an originally expected capacity owing to factors, such as of shadows of grass, shadows of buildings, and contamination of arrays.

Even if such factors occur, it is sometimes difficult for an owner of the solar photovoltaic generation system to notice the occurrence. If a maintenance provider for maintenance of solar photovoltaic generation visits the generation system in order to grasp situations of occurrence of the factors, detachment cost is required, which increases the cost. If the factors of reduction in performance can be identified before dispatch, an operator can select tools and parts for addressing the situations before he/she is dispatched to the solar photovoltaic generation system. Accordingly, more effective maintenance services can be achieved.

A method has been proposed that constructs an algorithm of estimating reduction in generation capacity performance, based on measurement data that includes the power, voltage, and current value measured in PCS (Power Conditioning System), and the solar irradiance at each time point. This method can find presence or absence of reduction in generation capacity performance, but cannot obtain the knowledge of factors of reduction in performance.

BRIEF DESCRIPTION OF THE DRAWINGS

FIG. 3 shows an example of a measurement DB;

FIG. 4 shows an example of an anomaly factor occurrence DB;

FIG. 11 shows a display example of a screen of a display device;

FIG. 12 shows a display example of a screen of the display device;

FIG. 13 shows an example of a user interface screen allowing a user to designate conditions;

FIG. 17 shows an example of anomaly factor occurrence data for simulation in an anomaly factor occurrence DB;

FIG. 19 shows an example of an integrated DB;

FIG. 20 shows an example of a user interface screen allowing the user to designate simulation data selection conditions;

FIG. 21 shows an example where multiple user interface screens are integrated into one;

DETAILED DESCRIPTION

Figure 1:
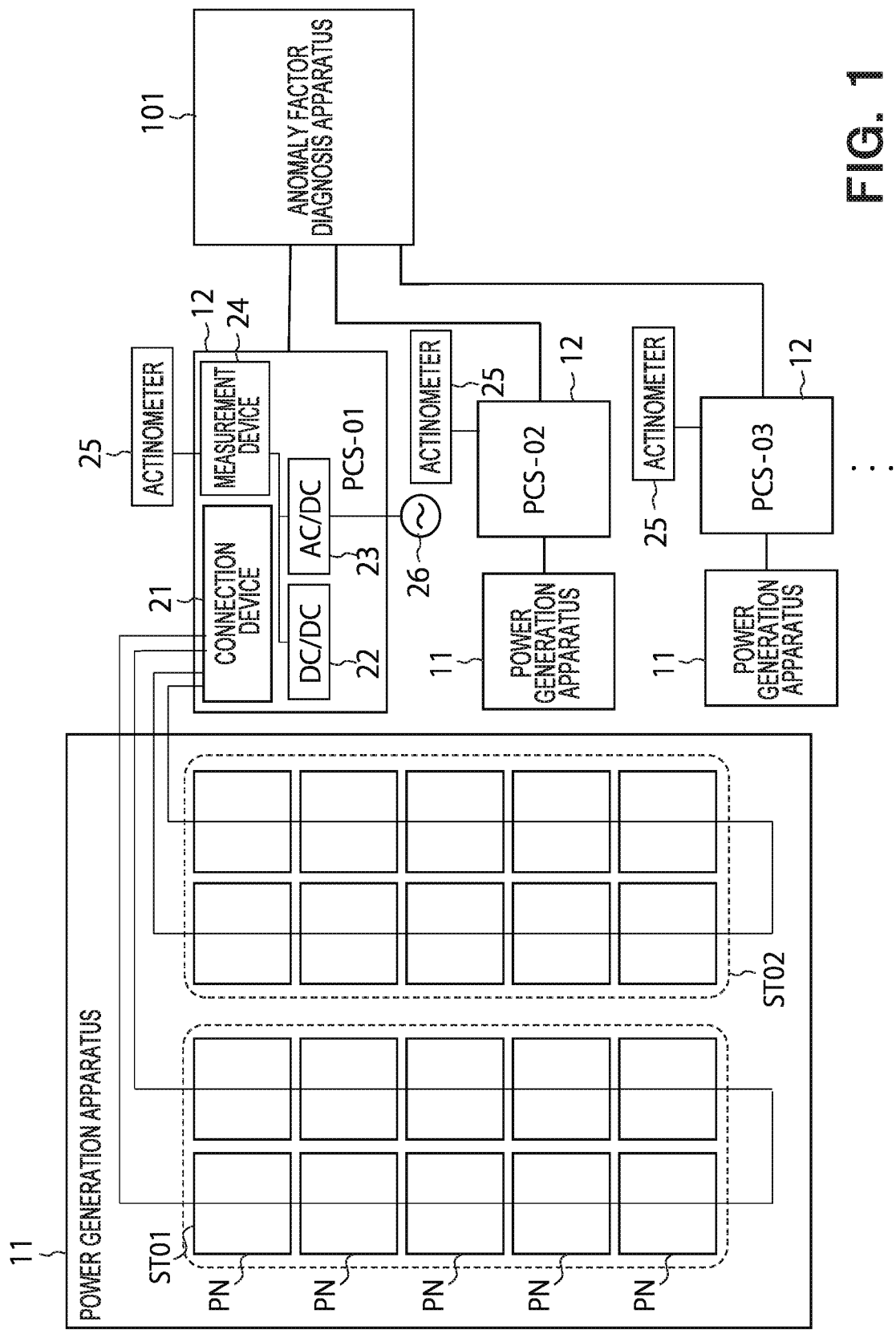
FIG. 1 shows an overall configuration of an anomaly factor diagnosis system that includes an anomaly factor diagnosis apparatus and a solar photovoltaic generation system according to a first embodiment.

According to one embodiment, an anomaly factor diagnosis apparatus includes an identifier, a distribution generator and an evaluator. The identifier is configured to identify a first measurement data item corresponding to a first time point when an anomaly factor occurs in a power generation apparatus, among measurement data items in the power generation apparatus, based on anomaly factor occurrence data identifying the first time point. The distribution generator is configured to calculate a first distribution function representing a distribution of a feature value of the first measurement data item. The evaluator is configured to calculate an evaluation value of possibility of occurrence of the anomaly factor in the power generation apparatus, based on the first distribution function, and measurement data items to be tested in the power generation apparatus.

Hereinafter, referring to the drawings, embodiments of the present invention are described.

First Embodiment

FIG. 1 shows an overall configuration of an anomaly factor diagnosis system that includes an anomaly factor diagnosis apparatus and a solar photovoltaic generation system according to a first embodiment.

The solar photovoltaic generation system includes multiple basic units each including a power generation apparatus 11 and a PCS (Power Conditioner System) 12. The diagram shows a case where one or more basic units exist. The PCSs 12 of the basic units are respectively represented as PCS-01, PCS-02 and PCS-03. The power generation apparatus 11 includes one or more strings in each of which one or more PV panels PN are connected in series. In the diagram, the power generation apparatus 11 of the first basic unit includes two strings ST01 and ST01. The numbers of strings included in the power generation apparatuses 11 of the basic units may be different from each other.

The PCS 12 of each basic unit controls the one or more strings in the power generation apparatus 11 connected to the PCS 12. Each PCS 12 includes a connection device 21, a DC/DC converter 22, an AC/DC converter 23, and a measurement device 24. An actinometer 25 is connected to the measurement device 24 of each PCS 12. The measurement devices 24 of PCSs 12 are commonly connected to the anomaly factor diagnosis apparatus 101.

The connection device 21 of each PCS 12 is connected to one or more strings in the power generation apparatus 11, and aggregates the generated power in the string. The AC/DC converter 23 converts the power aggregated by the connection device 21 into AC power, and outputs the power to a power system 26. The AC/DC converter 23 may output the aggregated power to an AC-power-operated load apparatus, instead of the power system 26. Alternatively, the DC/DC converter 22 may transform (step up or down) the power aggregated by the connection device 21, and output the transformed power to an accumulator apparatus or a load apparatus, not shown. The method of using the power aggregated by the connection device 21 is not limited thereto.

The measurement device 24 measures the power, voltage, current and the like aggregated by the connection device 21. Furthermore, the measurement device 24 may measure the air temperature, humidity and the like. The actinometer 25 measures the solar irradiance.

There is no limitation to the scale of the solar photovoltaic generation system according to this embodiment. For example, a power generation system that includes 1,000 PV panels or more and has a scale of several hundred kilowatts or more is also encompassed by this embodiment.

Figure 2:
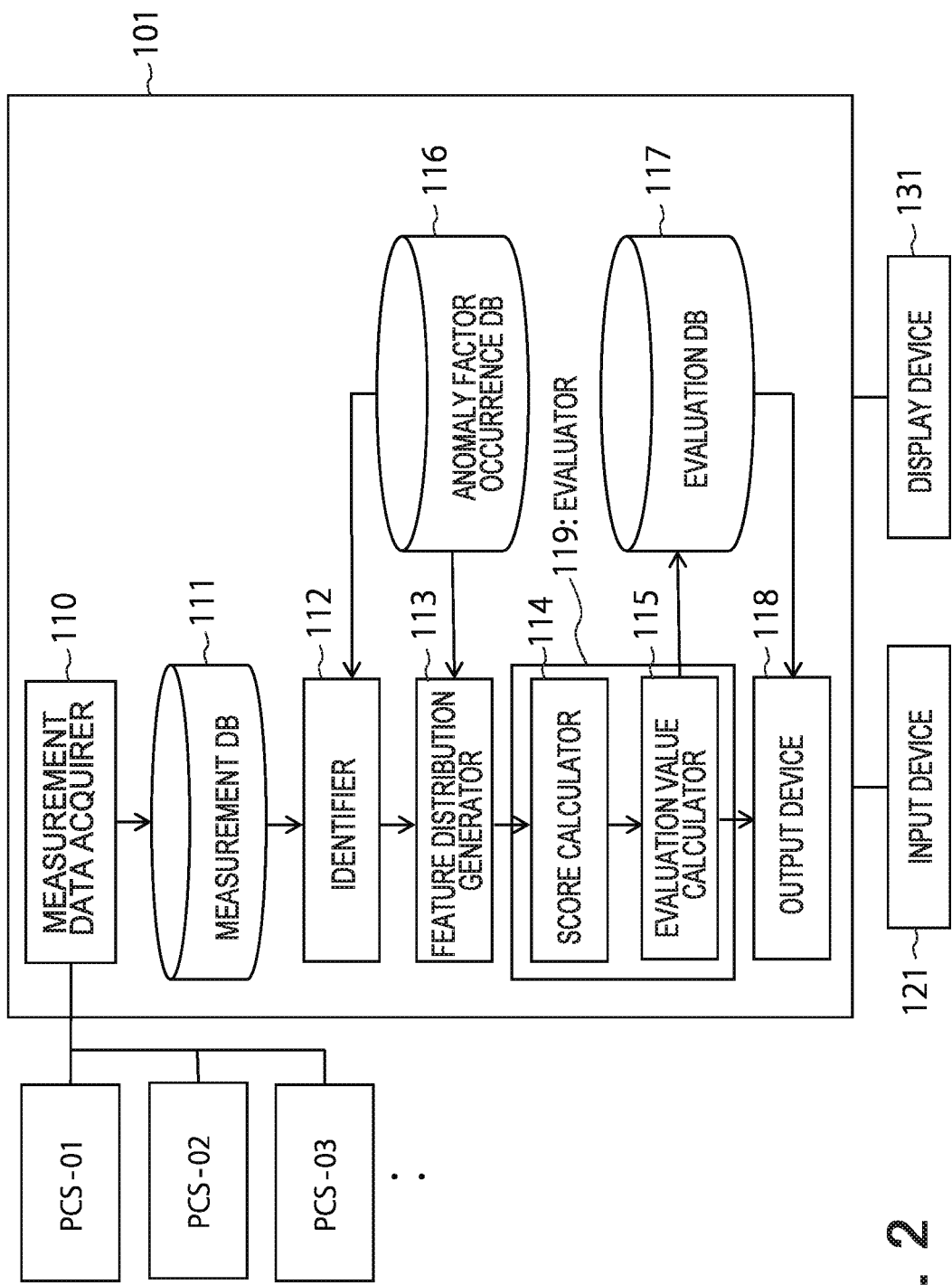
FIG. 2 is a block diagram of the anomaly factor diagnosis apparatus.

FIG. 2 is a block diagram of the anomaly factor diagnosis apparatus 101. The anomaly factor diagnosis apparatus 101 includes a measurement data acquirer 110, a measurement database (DB) 111, an identifier 112, a feature distribution generator 113, a score calculator 114, an evaluation value calculator 115, an anomaly factor occurrence DB 116, an evaluation DB 117, and an output device 118. The pair of the score calculator 114 and the evaluation value calculator 115 corresponds to an evaluator 119. An input device 121 and a display device 131 are connected to the anomaly factor diagnosis apparatus 101. The input device 121 is a device for allowing a user to input data or an instruction, such as a keyboard, a mouse or a touchpad. The display device 131 is a device for displaying data generated by this apparatus 101 or data stored in each DB included in this apparatus 101. The display device 131 is, for example, a liquid crystal display device, an organic EL display device, a CRT display device or the like.

The measurement data acquirer 110 receives time-series measurement data continuously or intermittently transmitted from each PCS. The measurement data includes, for example, measurement time points, solar irradiances, air temperatures, "PCS_IDs" (identifiers of PCSs), DC voltages, DC currents, and DC powers (generation capacity). "PCS_ID" is an ID assigned to each PCS (or basic unit). The measurement data acquirer 110 stores the received measurement data in the measurement DB 111. The measurement DB 111 manages data in a table format. The measurement interval of each PCS is preset, and is, for example, 1 minute or 60 minutes.

FIG. 3 shows an example of a measurement DB 111. The measurement DB 111 stores data on measurement time points, solar irradiances, air temperatures, "PCS_IDs" (identifiers of PCSs), DC voltages, DC currents, DC powers and the like. In the illustrated example, the measurement data is stored at intervals of one minute.

The anomaly factor occurrence DB 116 associates the measurement data accumulated in the measurement DB 111 with labels each representing presence or absence of occurrence of an anomaly factor, and stores the associated data as anomaly factor occurrence data. The anomaly factor occurrence data is data that identifies the time point when the anomaly factor occurs. The label may be assigned to every measurement data item, or assigned only to measurement data items with specific "PCS_IDs" or those in a specific time slot (for example, an evaluation time slot described later). For example, a user (operator) preliminarily verifies presence or absence of the anomaly factor at an actual place where the solar photovoltaic generation apparatus is installed, and sets the label of each measurement data item on the basis of the verified result. The label may be set by the user using the input device 121. Alternatively, the label may be set through an external apparatus such as a PC (Personal Computer), a server, or a tablet terminal, and data on the set label may be installed from the external apparatus. Examples of the anomaly factors include shadows (for example, shadows of trees, and shadows of grass) are casted on PV panels, contamination of PV panels (array contamination), etc. Any of the anomaly factors causes reduction in generation capacity.

FIG. 4 shows an example of the anomaly factor occurrence DB 116. For each of the three PCS-01, PCS-02 and PCS-03, a label of presence or absence of a rod-shaped shadow, and a label of presence or absence of array contamination are set at every time point. "Presence" means presence of anomaly. "Absence" means absence of anomaly. For example, it is shown that on and after 2017/10/10 8:03, PCS-03 had no rod-shaped shadow but had array contamination. The labels are not necessarily set for the entire time of day. Alternatively, a time slot for an evaluation target (evaluation time slot) in a day may be set, and the label may be set only in the evaluation time slot (see FIG. 13 with which detailed description is made). Example of the evaluation time slot is time slots (e.g., 8:00 to 17:00, 10:00 to 16:00, etc.) during which power generation is expected, for example. The following description assumes a case where the label is assigned to the evaluation time slot. A time point when the anomaly factor occurs corresponds to a first time point in this embodiment. A time point when no anomaly factor occurs corresponds to a second time point in this embodiment.

The identifier 112 acquires, as training data, measurement data items in the evaluation time slot among the measurement data items stored in the measurement DB 111. The identifier 112 also acquires the anomaly factor occurrence data stored in the anomaly factor occurrence DB 116. The identifier 112 and the feature distribution generator 113 perform the processes thereafter for each PCS and each anomaly factor.

The identifier 112 identifies measurement data assigned the label of presence of anomaly (hereinafter called positive-example data), and measurement data assigned the label of absence of anomaly (hereinafter called negative-example data) on the basis of the acquired measurement data, and classifies the data into a group of positive-example data and a group of negative-example data. A group to which the positive-example data belongs is called a positive-example group. A group to which the negative-example data belongs is called a negative-example group. The positive-example data corresponds to first measurement data according to this embodiment. The negative-example data corresponds to second measurement data according to this embodiment.

The feature distribution generator 113 calculates a distribution function (first distribution function) representing the distribution of feature values of the measurement data on the basis of the measurement data (first measurement data) that belongs to the positive-example group and belongs to the evaluation time slot on each day.

In further detail, first, the feature distribution generator 113 calculates the feature value as an indicator evaluating the generated power at every time point, on the basis of the measurement data that belongs to the positive-example group and belongs to the evaluation time slot on each day. For example, one feature value is obtained from one measurement data item. For example, a value obtained by dividing (DC power/solar irradiance) by the maximum value of (DC power/solar irradiance), can be used. A calculation formula of the feature value in this case is described as follows.

$$\text{Feature value} = (\text{DC power/solar irradiance})/(\text{maximum value of (DC power/solar irradiance)}) \quad (1)$$

The "maximum value of (DC power/solar irradiance)" is the maximum value of (DC power/solar irradiance) among values of (DC power/solar irradiance) calculated from each of the measurement data items that are all the measurement data items (all the positive-example group and negative-example group) in the evaluation time slot obtained from the measurement DB 111. Consequently, the feature value is a value ranging from zero to one, inclusive.

On each day, time-series data where feature values are arranged in time series in the evaluation time slot (hereinafter, called characteristic time-series data) is generated.

In a manner similar to that of the positive-example group, also for the negative-example group, the feature distribution generator 113 arranges the feature values in time series in the evaluation time slot on each day, and generates the characteristic time-series data.

In the middle of the evaluation time slot on a certain day, "presence of anomaly" can sometimes be changed to "absence of anomaly", or "absence of anomaly" can sometimes be changed to "presence of anomaly". In such a case, among the measurement data items in the evaluation time slot, measurement data items in some time slots are classified into the positive-example group, and the measurement data items in the other time slots belong to the negative-example group. In this case, the length of each characteristic time-series data item is shorter than the length of the evaluation time slot. Alternatively, in such a case, those having higher ratio of time lengths of presence of anomaly and absence of anomaly may be identified. All the measurement data items belonging to the evaluation time slot may be classified into a group corresponding to the identified one.

Figure 5:
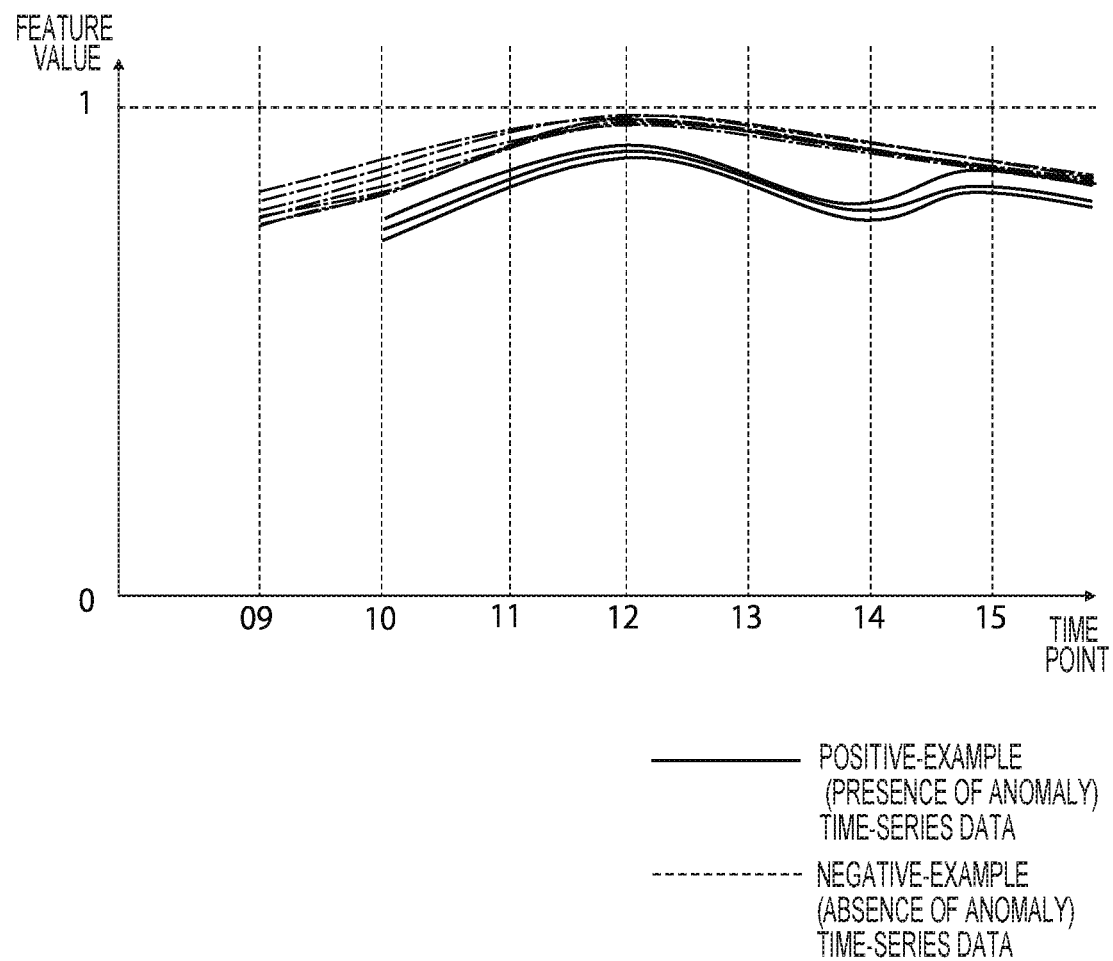
FIG. 5 shows a waveform graph of characteristic time-series data obtained each day for each of positive and negative-example groups.

FIG. 5 shows a waveform graph of characteristic time-series data obtained each day for each of the positive-example group and negative-example group. The abscissa axis indicates the time point. The ordinate axis indicates the feature value. The diagram indicates several characteristic time-series data items. In actuality, more characteristic time-series data items may be present. Solid-line waveforms indicate the characteristic time-series data items of the positive example (presence of anomaly). Broken-line waveforms indicate the characteristic time-series data items of the negative example (absence of anomaly). These characteristic time-series data items are from the same PCS. The negative-example characteristic time-series data items start at nine o'clock, and the positive-example characteristic time-series data items start at ten o'clock. This happens to be by chance. There is no limitation thereto.

The feature distribution generator 113 calculates the distribution function (feature distribution) of feature values in each unit time slot belonging to the evaluation time slot, with respect to each of the positive-example group and negative-example group. For example, the evaluation time slot is assumed to be from 9:00 to 17:00. The length of the unit time slot is assumed to be one hour. In this case, the feature distribution is calculated for each of the time slots (unit time slots) 9:00 to 10:00, 10:00 to 11:00, 11:00 to 12:00, . . . , 16:00 to 17:00. Specific examples of the feature distributions include a normal distribution that is a probability distribution. In this case, for example, the average and the variance may be obtained in each unit time slot for each group, and may be adopted as the parameters of the normal distribution. However, the probability distribution is not necessarily a normal distribution, and may be another type of probability distribution.

Figure 6:
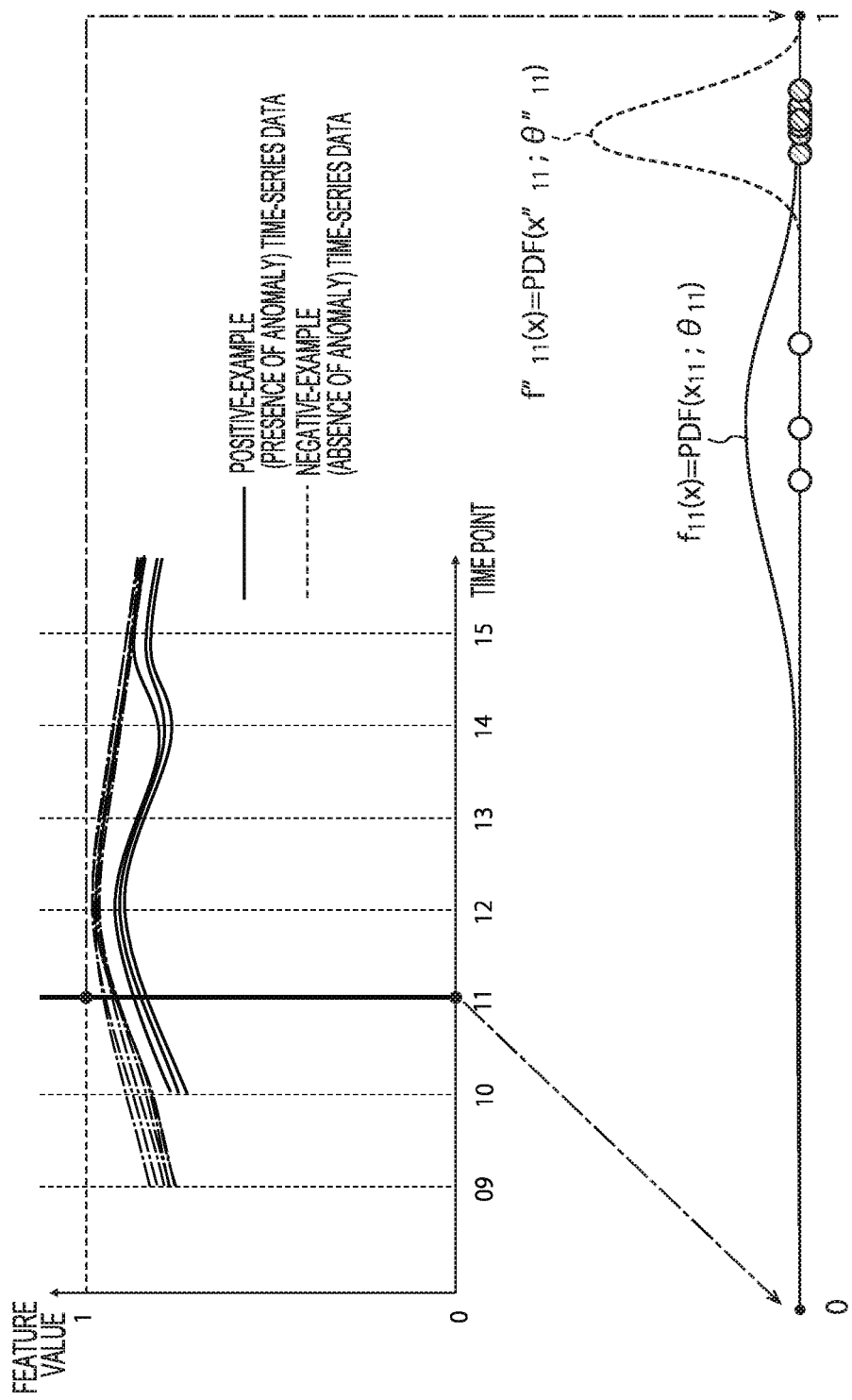
FIG. 6 shows an example of calculating a probability distribution (feature distribution)

FIG. 6 shows an example of calculating the feature distribution in a time slot of 11:00 to 12:00. An upper part of FIG. 6 shows a diagram identical to FIG. 5. For time point 11:00, the value of each positive-example characteristic time-series data item, and the value of each negative-example characteristic time-series data item are identified. These values correspond to the intersections between the graphs of respective time-series data items and a vertical line perpendicular to the temporal axis at the time point 11:00. A lower part of FIG. 6 shows an example where the values of these intersections are deployed and plotted on an axis that is of the feature value and is an abscissa axis. The values in the positive example are indicated by white blank circles, and the values in the negative example are indicated by hatched circles. The probability distribution approximating the positive-example point groups, and the probability distribution approximating the negative-example point groups are calculated. Here, a normal distribution is obtained as the probability distribution.

The average "$x_{11}$" and variance "$\theta_{11}$" of the positive-example feature values (plotted values) at the time point 11:00 are calculated, and a normal distribution $f_{11}(x)$=PDF $(x_{11}; \theta_{11})$ whose parameters are the calculated average and variance values is obtained. This is adopted as the probability distribution (first distribution function) of the positive example in the time slot of 11:00 to 12:00. This distribution "$f_{11}(x)$" is indicated by a solid line in a lower part of FIG. 6. The plotted points in the positive example are arranged in this distribution "$f_{11}(x)$".

Likewise, the average "$x''_{11}$" and variance "$\theta''_{11}$" of the negative-example feature values (plotted values) at the time point 11:00 are calculated, and a normal distribution $f''_{11}(x)$= PDF($x''_{11}$; $\theta''_{11}$) whose parameters are the calculated average and variance value is obtained. This is adopted as the probability distribution (second distribution function) of the negative example in the time slot of 11:00 to 12:00. This distribution "$f''_{11}(x)$" is indicated by a broken line in the lower part of FIG. 6. The plotted points in the negative example are arranged in this distribution "$f''_{11}(x)$".

Here, to calculate the probability distribution in the time slot of 11:00 to 12:00, the feature value at the time point 11:00 is used (this has a small amount of calculation and effective, if the variation in feature value in an hour is assumed to be small, for example). However, the probability distribution can be calculated using all the feature values belonging to the time slot of 11:00 to 12:00. Alternatively, the feature values may be selected by sampling from all the feature values belonging to the time slot of 11:00 to 12:00, and the probability distribution in the time slot of 11:00 to 12:00 may be calculated using the selected feature values.

Likewise, also for time slots other than the time slot of 11:00 to 12:00, the probability distributions are calculated.

Here, the unit time slot is assumed to be one hour. Without any limitation thereto, the unit time slot may be 10 minutes, 30 minutes, or two hours. The unit time slot may be the same as the measurement data obtaining time interval. In this case, at each time point of the measurement data (for example, each time point of one-minute interval), the probability distribution (feature distribution) is calculated.

As described above, a phase to the process of generating the feature distribution in each unit time slot, for each of the positive- and negative-example groups, is called a training phase. The processes thereafter use the feature distribution generated by training to diagnose presence or absence of occurrence of the anomaly factor through use of measurement data on days in which presence or absence of occurrence of the anomaly factor has not been known. This phase is called a test phase. Hereinafter, the test phase is described.

The score calculator 114 scores the measurement data on each day serving as test targets, using the positive- and negative-example feature distributions in each unit time slot generated by the feature distribution generator 113. The measurement data on each day serving as test targets is data different from the measurement data used to generate the feature distribution, and is measurement data on days assigned no label in the anomaly factor occurrence DB. The details of scoring are hereinafter described.

Figure 7:
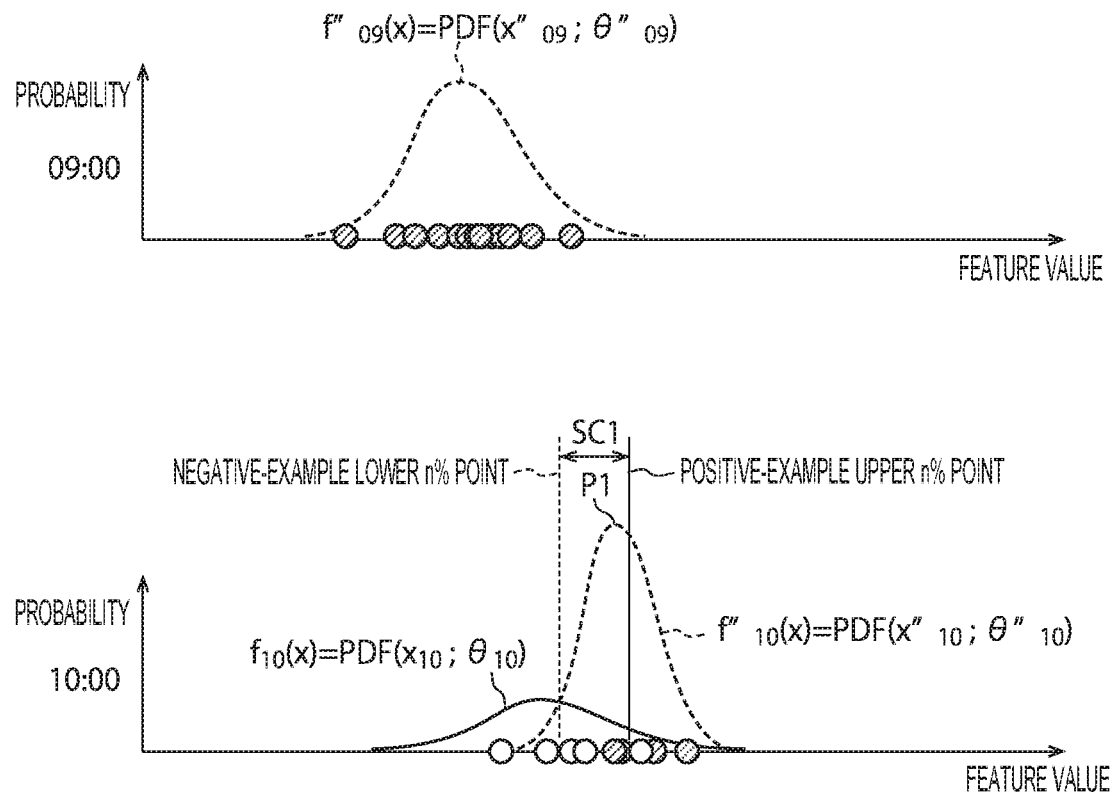
FIG. 7 is a diagram for illustrating specific examples of operations of a score calculator.
Figure 8:
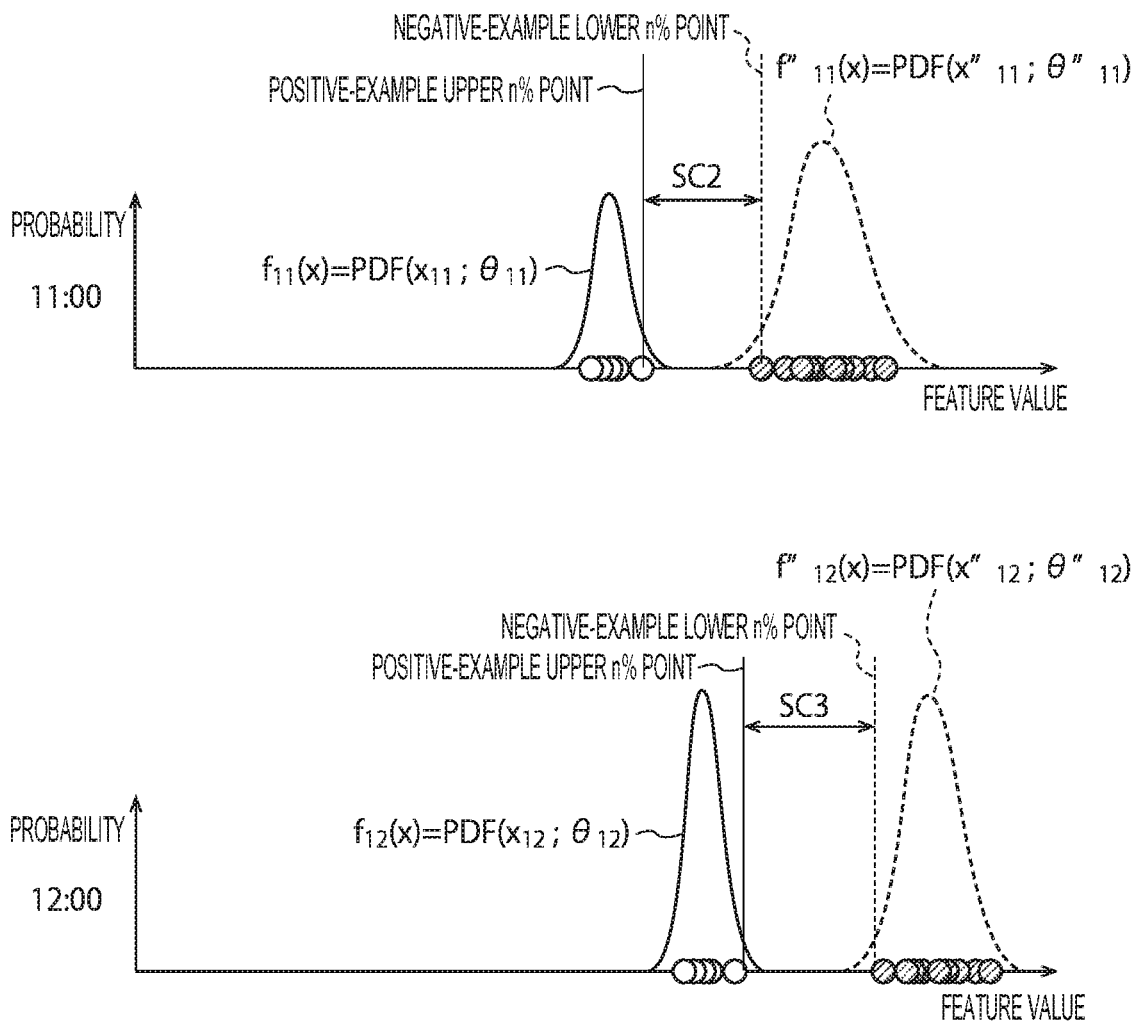
FIG. 8 is a diagram for illustrating specific examples of operations of the score calculator.

The score calculator 114 verifies whether the pair of the positive- and negative-example feature distributions satisfies the distribution separation condition or not in each unit time slot in the evaluation time slot. The separation condition includes a first requirement and a second requirement. The score calculator 114 selects, as the score calculation time slot, the unit time slot in which the pair satisfies both the requirements. Referring to FIGS. 7 and 8, the operations of the score calculator 114 are described.

FIGS. 7 and 8 are diagrams for illustrating specific examples of operations of the score calculator 114. Each unit time slot belonging to the evaluation time slot is adopted as targets, and it is verified whether the slot satisfies the first and second requirements or not.

The first requirement is that both the positive-example feature distribution and the negative-example feature distribution are generated in the unit time slot as a target. If at least one of the feature distributions is not generated, the unit time slot does not satisfy the first requirement.

An example of the upper part of FIG. 7 indicates the negative-example feature distribution "f"$_{09}$(x)" in the unit time slot of 9:00 to 10:00. The positive-example characteristic time-series data including the unit time slot is absent. Accordingly, no positive-example feature distribution has been generated. Consequently, this unit time slot does not satisfy the first requirement.

The second requirement is that both the positive-example feature distribution and the negative-example feature distribution are separated in the unit time slot as a target. If these feature distributions are adjacent to each other, the second requirement is not satisfied. The determination of whether the positive-example feature distribution and the negative-example feature distribution are separated from each other or not is performed as follows.

The upper n % point (for example, 0.1) in the positive-example feature distribution is assumed as the positive-example upper n % point. The lower n % point in the negative-example feature distribution is assumed as the negative-example lower n % point. If neither the peak of the positive-example feature distribution nor the peak of the negative-example feature distribution belong to a section between the positive-example upper n % point and the negative-example lower n % point, the second requirement is satisfied. If at least one of the peaks of the feature distributions belongs to this section, the second requirement is not satisfied. The values of % points are "n" for both the positive-example feature distribution and the negative-example feature distribution. Alternatively, the values of % points may be different from each other.

An example of the upper part of FIG. 7 indicates the positive-example feature distribution "f$_{10}$(x)" and the negative-example feature distribution "f"$_{10}$(x)" in the unit time slot of 10:00 to 11:00. The section SC1 between the positive-example upper n % point of the positive-example feature distribution "f$_{10}$(x)" and the negative-example lower n % point of the negative-example feature distribution "f"$_{10}$(x)" is indicated. The peak "P1" of the negative-example feature distribution "f"$_{10}$(x)" belongs to the section SC1. Consequently, this unit time slot does not satisfy the second requirement.

An example of the lower part of FIG. 8 indicates the positive-example feature distribution "f$_{11}$(x)" and the negative-example feature distribution "f"$_{11}$(x)" in the unit time slot of 11:00 to 12:00. The section SC2 between the positive-example upper n % point of the positive-example feature distribution "f$_{11}$(x)" and the negative-example lower n % point of the negative-example feature distribution "f"$_{11}$(x)" is indicated. Any of the peaks of the positive-example feature distribution and the negative-example feature distribution does not belong to the section SC2. Consequently, this unit time slot satisfies the second requirement. Since two feature distributions are generated, the first requirement is also satisfied. Consequently, this unit time slot is selected as the score calculation time slot.

An example of the lower part of FIG. 8 indicates the positive-example feature distribution "f$_{12}$(x)" and the negative-example feature distribution "f"$_{12}$(x)" in the unit time slot of 12:00 to 13:00. The section SC3 between the positive-example upper n % point of the positive-example feature distribution "f$_{12}$(x)" and the negative-example lower n % point of the negative-example feature distribution "f"$_{12}$(x)" is indicated. Any of the peaks of the positive-example feature distribution and the negative-example feature distribution does not belong to the section SC3. Consequently, this unit time slot satisfies the second requirement. Since two feature distributions are generated, the first requirement is also satisfied. Consequently, this unit time slot is selected as the score calculation time slot.

Likewise, also for each of unit time slots after 13:00, it is determined whether the first requirement and the second requirement are satisfied or not. The unit time slot satisfying both the requirements (i.e., satisfying the separation condition) is selected as the score calculation time slot.

In the examples in FIGS. 7 and 8, the positive-example feature distribution is disposed on a side with a smaller feature value (to the left on the sheet) than the negative-example feature distribution. However, according to a certain feature value definition, the disposition may be inverted in some cases. In such cases, the lower n % point (for example, 0.1) in the positive-example feature distribution is assumed as the positive-example lower n % point. The upper n % point in the negative-example feature distribution is assumed as the negative-example upper n % point. If neither the peak of the positive-example feature distribution nor the peak of the negative-example feature distribution belongs to a section between the positive-example lower n % point and the negative-example upper n % point, it may be determined that the second requirement is satisfied.

The score calculator 114 calculates the score according to the feature value, for the score calculation time slot selected from among the unit time slots belonging to the evaluation time slot. A score calculation method is hereinafter described.

Figure 9:
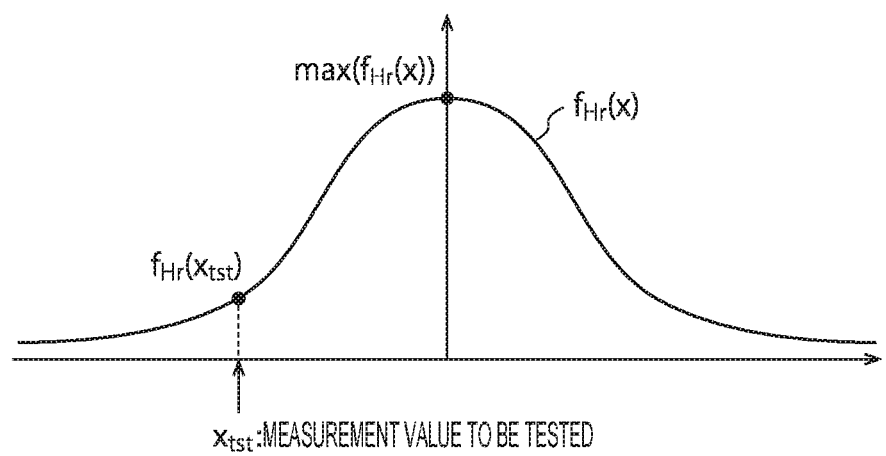
FIG. 9 is a diagram for illustrating score calculation in a score calculation time slot.

FIG. 9 is a diagram for illustrating an example of score calculation in a certain score calculation time slot. The diagram schematically shows the positive-example feature distribution "$f_{Hr}(x)$" in a calculation target time slot. "x" is an input variable representing the feature value. "Hr" is a value indicating the calculation target time slot. For example, the feature distribution in the time slot of 11:00 to 12:00 is represented as "$f_{11}(x)$". The feature value "$x_{tSt}$" of the test target measurement data in the calculation target time slot is divided by the maximum value ($\max(f_{Hr}(x))$) of the positive-example feature distribution in the calculation target time slot. Accordingly, the score "scr" in the score calculation time slot is obtained. The calculation formula of the score "scr" in the time slot "Hr" is described as follows. In this example, in each calculation target time slot, the larger the feature value, the larger the score is. However, the relationship between the feature value and the score may vary in conformity with the definition of the feature value.

$$scr_{Hr} = x_{tst} / \max(f_{Hr}(x)) \quad (2)$$

Here, a score calculation condition is introduced. If the score calculation condition is satisfied, the score calculator 114 may calculate the score by the formula (2). If not satisfied, the score may be uniformly zero.

Specifically, first, a % point is calculated which is of the negative-example feature distribution in the score calculation time slot and to which the feature value of the test target measurement data corresponds. The calculated % point, and a reference point (n % point) on a side of the positive-example feature distribution between the upper side and the lower side of the negative-example feature distribution are compared with each other. If the calculated point is disposed nearer to the positive-example feature distribution than the reference point, the score calculation condition is satisfied. In this case, the score is calculated by the formula (2). On the contrary, if the calculated point is disposed nearer to the negative-example feature distribution than the reference point, the score calculation condition is not satisfied. In this case the score is assumed as zero.

Figure 10:
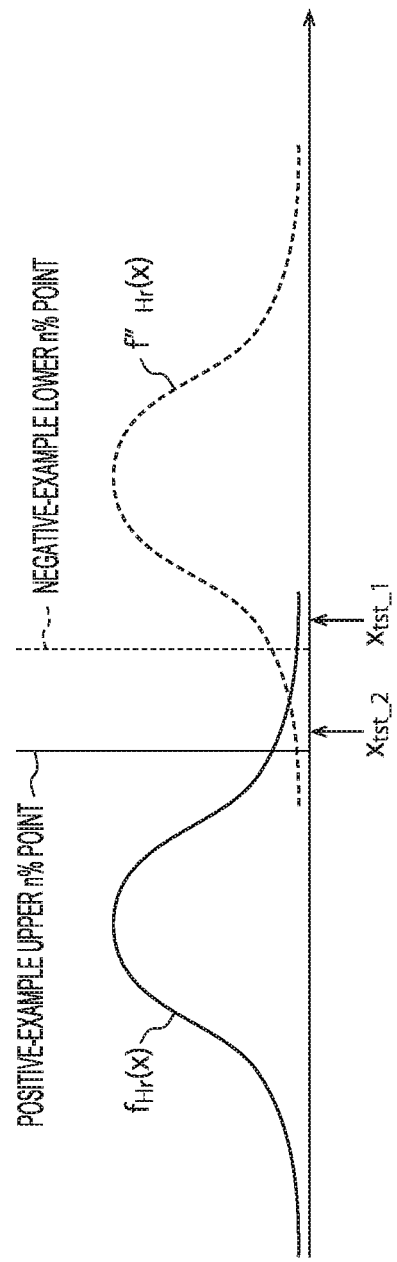
FIG. 10 is a diagram for illustrating a specific example of a score calculation condition.

FIG. 10 is a diagram for illustrating a specific example of the score calculation condition. A case where the feature value of the test target measurement data in a certain calculation target time slot is "$x_{tst\_1}$" and a case of the value is "$x_{tst\_2}$" are discussed. "$x_{tst\_1}$" is disposed on the negative-example feature distribution side with respect to the lower n % point (reference point) of the negative-example feature distribution. That is, "$x_{tst\_1}$" is larger than the reference point. Accordingly, the score calculation condition is not satisfied. Consequently, the score in the calculation target time slot is assumed as zero. Meanwhile, "$x_{tst\_2}$" is disposed on the positive-example feature distribution side with respect to the lower n % point (reference point) of the negative-example feature distribution. That is, "$x_{tst\_2}$" is smaller than the reference point. Accordingly, the score calculation condition is satisfied. The score in the calculation target time slot is calculated by the formula (2).

Without introduction of the score calculation condition, the score can be calculated by the formula (2) in all the calculation target time slots.

After calculation of the score in each score calculation time slot, the score calculator 114 generates an anomaly factor vector "V" (hereinafter a vector "V") including the score in each score calculation time slot. A definition formula of the vector "V" is described as follows. The score calculator 114 generates the vector "V" for each day as a test target.

$$V = (scr_{T1}, scr_{T2}, \ldots, scr_{Ti}) \quad (3)$$

"$scr_{T1}$" is the score in a score calculation time slot "T1". "$scr_{T2}$" is the score in a score calculation time slot "T2". "$scr_{Ti}$" is the score in a score calculation time slot "Ti". For example, the score calculation time slots are represented as "T1, T2, ..., Ti" in an ascending order of time. For example, "T1" is the time slot of 11:00 to 12:00, and "T2" is the time slot of 12:00 to 13:00.

The evaluation value calculator 115 calculates an evaluation value "E" of the anomaly factor occurrence possibility for each day using the vector "V" on each day generated by the score calculator 114. The evaluation value "E" is, for example, the average value of the scores included in the vector "V". A definition formula of the score in this case is described as follows.

$$E = \frac{\sum_{Ti \in T_{avail}} scr_{Ti}}{N(T_{avail})} \quad (4)$$

"$T_{avail}$" represents a set of the calculation target time slots. $N(T_{avail})$ represents the number of elements included in "$T_{avail}$". "Ti" represents the i-th element included in "$T_{avail}$". The numerator of the formula (4) represents the total of the scores of the elements (calculation target time slot) included in the set "$T_{avail}$".

In this example, the evaluation value "E" ranges from zero to one. The closer to "1" the evaluation value "E" is, the higher the anomaly factor occurrence possibility is. Instead of the average, the median, the maximum value or the minimum value may be adopted as the evaluation value "E". A value obtained by weighted-averaging the elements included in the vector may be adopted as the evaluation value "E".

The evaluation value calculator 115 stores, in the evaluation DB 117, result data that includes the evaluation value "E", "PCS_ID" (the identifier of PCS), and the date, as one set.

The output device 118 generates output information to be displayed, on the basis of the result data stored in the evaluation value calculator 115, and outputs the information to the display device 131. The display device 131 displays, on a screen, the output information input from the output device 118. For example, the output device 118 sorts the result data items stored in the evaluation value calculator 115 in a descending order of the evaluation value, and outputs an evaluation table including the sorted result data items, to the display device 131.

The output device 118 may compare the evaluation value of each result data item with a preset threshold, and assign a determination label according to the comparison result to the result data item. Specifically, if the evaluation value is equal to or more than the threshold, the possibility of anomaly factor occurrence is high, and a determination label of "presence of anomaly" or "confirmation required" is assigned to the result data item. If the evaluation value is less than the threshold, the possibility of anomaly factor occurrence is low, and a determination label of "absence of anomaly" or "good" is assigned to the result data item. The threshold may be different with respect to the type of the anomaly factor. The output device 118 may output an evaluation table that associates the assigned determination labels with the result data, to the display device 131.

FIGS. 11 and 12 show display examples of the screen of the display device 131. FIG. 11 shows the example of an evaluation table in a case where the anomaly factor is a rod-shaped shadow. FIG. 12 shows the example of an evaluation table where the anomaly factor is array contamination. Execution of the processes having been described so far with respect to each anomaly factor can obtain the evaluation table for each anomaly factor. The evaluation table associates the determination label assigned to each result data item ("confirmation required" or "good").

For example, in FIG. 11, the first to ninth result data items have evaluation values equal to or larger than the threshold (here, 0.7). Accordingly, the determination label of "confirmation required" is assigned. The tenth result data item and those thereafter have evaluation values smaller than the threshold. Accordingly, the determination label of "good" is assigned.

In the example in FIG. 12, the first to fifth result data items have evaluation values equal to or larger than the threshold (here, 0.6). Accordingly, the determination label of "confirmation required" is assigned. The sixth result data item and those thereafter have evaluation values smaller than the threshold. Accordingly, the determination label of "good" is assigned.

The user can utilize, for example, the table of FIG. 11 as knowledge for determining presence or absence of occurrence of a rod-shaped shadow. For example, the user determines that "PCS_01" has a high possibility of occurrence of a rod-shaped shadow, on the basis of the table of FIG. 11, and can preliminarily perform preparation required to remove the rod-shaped shadow, when dispatching an operator to an actual place. Likewise, the table of FIG. 12 can also be utilized as knowledge for determining presence or absence of occurrence of array contamination.

In this embodiment, the user may designate the condition of the training phase (training condition), and the condition of the test phase (test condition), and perform the processes in the training phase and the test phase according to the conditions designated by the user.

FIG. 13 shows an example of a user interface screen allowing the user to designate conditions. This apparatus displays this screen on the display device 131, and the user inputs conditions through the input device 121.

As an example of the training condition, the threshold of the solar irradiance (0.7 in the example of the diagram) may be designated. In this case, the measurement data on a day having a solar irradiance equal to or higher than the threshold (corresponding to a fine day if the threshold is high to some extent) is used as the training data. The period of the measurement data used as the training data may be designated as a training target period (Jul. 1, 2018 to Aug. 31, 2018 in the illustrated example). Alternatively, the range of culmination altitude used for the training data may be designated (44 to 54 degrees in the illustrated example). In this case, correspondence data between the time point and the culmination altitude is preliminarily stored in DB. The correspondence data may be acquired by receiving the data from an external server. Items other than those described here may be present as training conditions. For example, the range of the generation capacity (power value) may be designated, and only the measurement data items belonging to the designated range of the generation capacity may be used as the training data.

As an example of the test condition, the target period of the measurement data adopted as the test target (test target period) may be designated (Jul. 1, 2019 to Jul. 31, 2019 in the illustrated example). The test target period may be designated in a form across years. For example, designation of "a period from July 1 to August 31 as each year" may be made.

As conditions common to the training conditions and the test conditions, the unit time interval (60 minutes in the illustrated example) and the evaluation time slot (10:00 to 16:00 in the illustrated example), which have been described above, may be designated.

Figure 14:
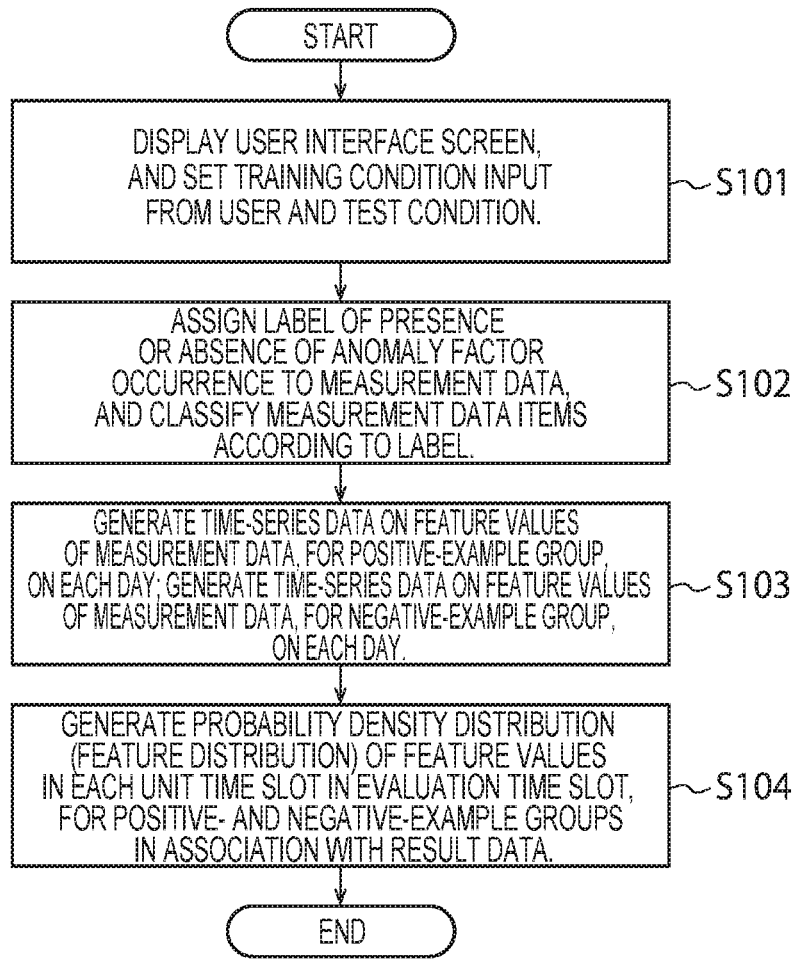
FIG. 14 is a flowchart of operations of a measurement data acquirer and a feature distribution generator according to the first embodiment.

FIG. 14 is a flowchart of an example of operations of the measurement data acquirer 110, the identifier 112 and the feature distribution generator 113 according to this embodiment. This flowchart mainly indicates the operations pertaining to the training phase.

For example, before the processing starts, the measurement data acquirer 110 acquires the measurement data from each PCS, and stores the data in the measurement DB 111. A label representing presence or absence of anomaly factor occurrence at every time point with respect to each PCS is preliminarily stored in the anomaly factor occurrence DB 116 on each anomaly factor basis. The user inputs instruction data on start of the processing, and the processing starts according to the input instruction data.

In step S101, this apparatus may display the user interface screen on the display device 131, and allow the user to set the conditions in the training phase (training conditions), and the conditions in the test phase (test conditions). This step may be omitted. In this case, the processes thereafter are performed according to predetermined training conditions and test conditions.

The identifier 112 and the feature distribution generator 113 performs the processes thereafter for each PCS and each anomaly factor.

In step S102, the identifier 112 reads the measurement data in the evaluation time slot from the measurement DB 111, and assigns the read measurement data the label of presence or absence of occurrence of the anomaly factor using the anomaly factor occurrence DB 116. After all the measurement data items are assigned the labels, the measurement data items are classified into the positive-example group and the negative-example group according to the values of the labels. The measurement data item assigned the label of presence of anomaly is classified into the positive-example group. The measurement data item assigned the label of absence of anomaly is classified into the negative-example group.

In step S103, the feature distribution generator 113 calculates the feature values of the measurement data items in the positive-example group, and generates time-series data (characteristic time-series data) where the feature values are arranged in a time-series manner on a day-by-day basis. Likewise, also for the negative-example group, characteristic time-series data is generated on a day-by-day basis.

In step S104, the feature distribution generator 113 generates the probability distribution of the feature values (positive-example feature distribution) in each unit time slot in the evaluation time slot, on the basis of the characteristic time-series data items on multiple days in the positive-example group. Likewise, also for the negative-example group, the probability distribution of the feature values (negative-example feature distribution) is generated in each unit time slot in the evaluation time slot. The feature distribution generator 113 transmits the generated positive- and negative-example feature distributions to the score calculator 114. The feature distribution generator 113 may store the generated positive- and negative-example feature distributions in a storage device readable from the score calculator 114. The score calculator 114 may read the positive- and negative-example feature distributions from the storage device. According to the processes described above, for each PCS, the positive-example feature distribution and the negative-example feature distribution in each unit time slot in the evaluation time slot are generated with respect to each anomaly factor.

Figure 15:
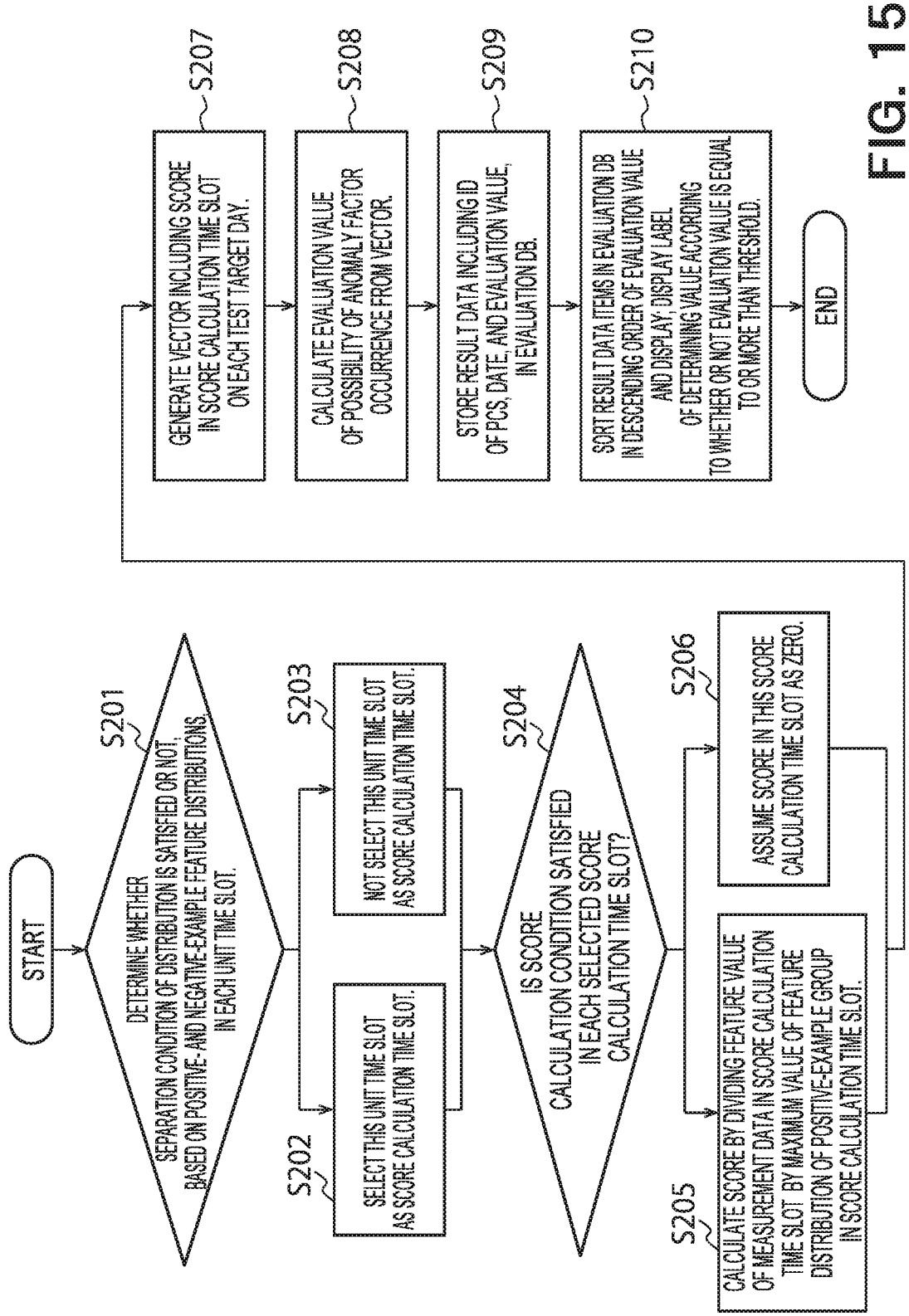
FIG. 15 is a flowchart of operations of the score calculator, an evaluation value calculator, and an output device according to the first embodiment.

FIG. 15 is a flowchart of an example of operations of the score calculator 114, the evaluation value calculator 115, and the output device 118 according to this embodiment. This flowchart mainly indicates the processes pertaining to the test phase. The processes in FIG. 15 may be performed sequentially to the processes in FIG. 14, or may be performed at timing independent from that of the processes in FIG. 14. The timing when the processes in FIG. 14 are performed, and the timing when the processes in FIG. 15 are performed may be separately controlled by the user. The processes thereafter are performed for each PCS with respect to each type of the anomaly factor.

In step S201, the score calculator 114 determines whether the predetermined separation condition is satisfied or not, in each unit time slot included in the evaluation time slot, using the positive-example feature distribution and the negative-example feature distribution. As the positive-example feature distribution and the negative-example feature distribution, distributions according to the corresponding PCS and the corresponding type of the anomaly factor are used. The details of the separation condition are as described above.

In step S202, if the separation condition is satisfied, it is determined that the positive-example feature distribution and the negative-example feature distribution are sufficiently separated from each other, and the unit time slot is selected as the score calculation time slot. In step S203, if the separation condition is not satisfied, it is determined that the overlap between the positive-example feature distribution and the negative-example feature distribution is large, and the unit time slot is not selected as the score calculation time slot.

In step S204, the score calculator 114 determines whether the score calculation condition is satisfied or not in each score calculation time slot selected in step S202 on the basis of the test target measurement data on the PCS concerned. The details of the score calculation condition are as described above.

In step S205, if the score calculation condition is satisfied, the score calculator 114 calculates the feature value of the test target measurement data in the score calculation time slot (for example, the measurement data at the time point of start of the score calculation time slot). The calculated feature value is divided by the maximum value of the positive-example feature distribution in the score calculation time slot. The value obtained by division (divided value) is adopted as the score.

In step S206, if the score calculation condition is not satisfied, the score calculator 114 determines that the measurement data is adjacent to the negative-example feature distribution, and assumes the score in the score calculation time slot as zero.

In the example described above, the measurement data item at the time point of start of the score calculation time slot is used to calculate the score. Alternatively, one measurement data item may be selected from among the measurement data items belonging to the score calculation time slot, and the selected measurement data item may be used. In the example described above, one measurement data item is used to calculate the score. Alternatively, multiple measurement data items belonging to the score calculation time slot may be used as test targets. In this case, for example, steps S205 and S206 are performed for each measurement data item. The average, median, maximum value or the like of the values (divided values or zero) obtained for these measurement data items are calculated, and the calculated value may be adopted as the score. The score may be calculated by a method other than that described here.

In step S207, the score calculator 114 generates the vector "V" including the score in each score calculation time slot on each day as the test target.

In step S208, the evaluation value calculator 115 calculates the evaluation value "E" of the possibility of anomaly factor occurrence on the basis of the vector "V". For example, the evaluation value "E" is calculated by calculating the average of the elements included in the vector "V". Instead of the average, the median, the maximum value or the minimum value may be adopted as the evaluation value "E". A value obtained by weighted-averaging the elements included in the vector may be adopted as the evaluation value "E".

In step S209, the evaluation value calculator 115 generates result data including the ID of PCS, the date and the evaluation value of the possibility of anomaly factor occurrence, and stores the result data in the evaluation DB 117. The result data items for individual PCSs are stored in the evaluation DB 117, with respect to each type of the anomaly factor and in a table format.

In step S210, the output device 118 sorts the result data items in the evaluation DB 117 in a descending order of the evaluation value, and generates output information to be displayed. The output information is generated for each type of the anomaly factor, for example. The output device 118 outputs the generated output information to the display device 131. The display device 131 displays the output information. The output device 118 may assign the result data item a determination label, according to whether or not the evaluation value of the result data item is equal to or more than the threshold. Output information where the determination labels are associated with the result data items may be generated. Display of the output information allows the user to use the determination label as an indication of determination of whether the anomaly factor occurs in each PCS or not.

According to this embodiment described above, the anomaly factor of the solar photovoltaic generation system can be identified.

Second Embodiment

In the first embodiment, the positive- and negative-example feature distributions are learned using actually measured data (actual measurement data) and data on presence or absence of occurrence of an actually measured anomaly (anomaly factor occurrence DB 116). However, an actual solar photovoltaic generation system has a low frequency of anomaly occurrence. In this case, there is a possibility that no positive-example characteristic time-series data can be obtained.

In a second embodiment, the positive- and negative-example feature distributions are generated using a solar photovoltaic generation simulation tool. As an example of the simulation tool, PVSyst has been known. The simulation tool can simulate the generation capacity, while adopting a panel installation condition, irradiation condition of sunlight, the ground form, and incident angles from sunrise to sunset or the like, as variations. The generation capacity can be simulated also in consideration with the weather and aerial light-shield elements, such as smog. Light shield objects on a plane having a light shield ratio ranging from 0 to 100%, a rod-shaped object and the like can be installed in a simulation space, as other light shield elements, and the effects thereof can be simulated.

If there is no obstacle, the panel-installed ground form is flat, and the weather is fine, the power generation capacity can be accurately estimated. On the contrary, if the solar irradiance decreases owing to the conditions of air and sky, such as cloud and rain, or the panels are installed on a non-flat place, the deviation of the generation capacity through simulation from an actual value is sometimes large, owing also to the effect of power transmission loss through wiring. The error sometimes corresponds to a ratio larger than a ratio of reduction in generation capacity due to anomaly factor occurrence. Accordingly, calibration is desirable so as to reduce the deviation between the simulation data and the actual value.

Figure 16:
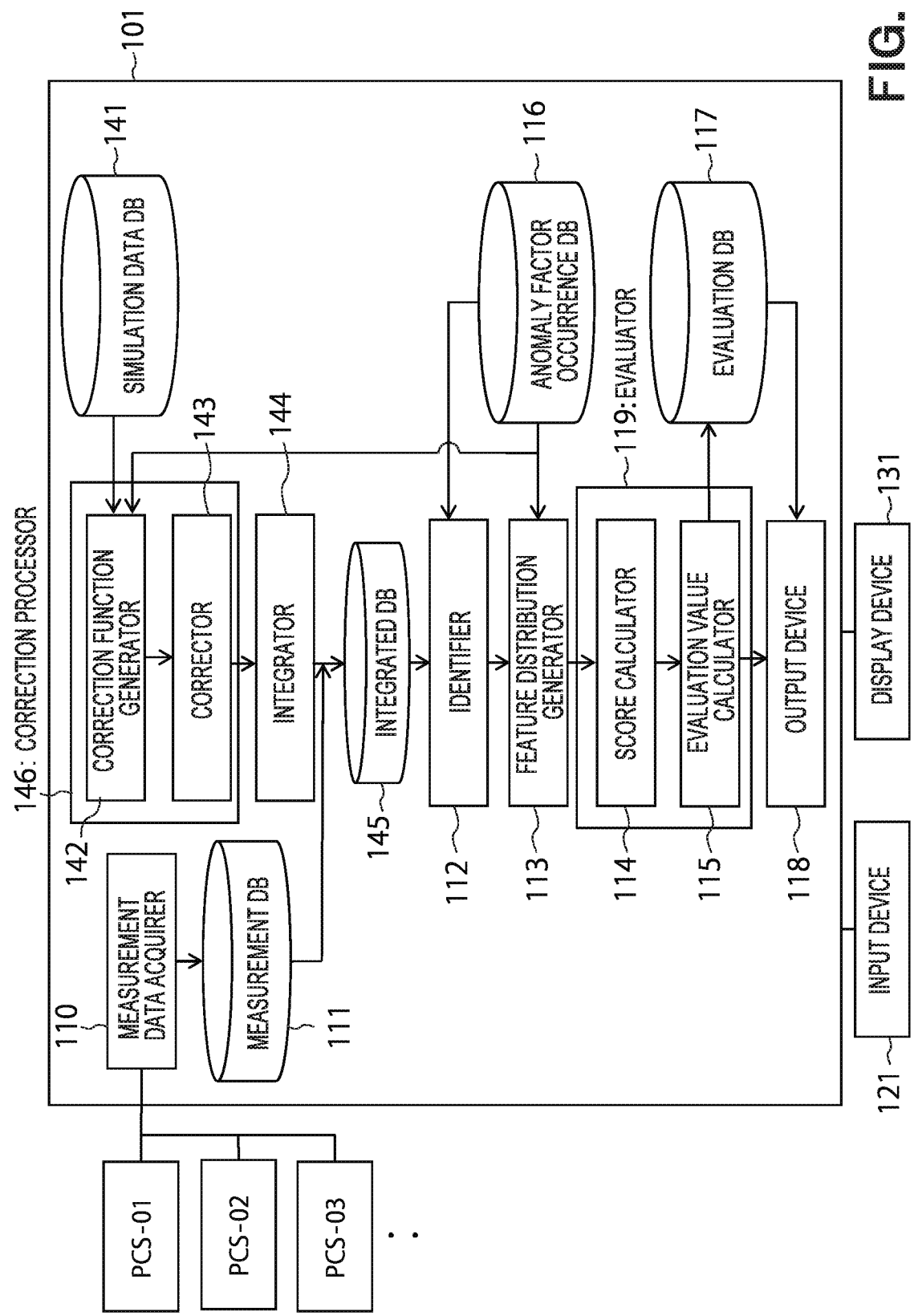
FIG. 16 is a block diagram of an anomaly factor diagnosis apparatus according to a second embodiment.

FIG. 16 is a block diagram of an anomaly factor diagnosis apparatus according to a second embodiment. Elements identical or corresponding to those in the block diagram of FIG. 2 are assigned the same symbols, and the description thereof is omitted except for changed or enhanced processes. The anomaly factor diagnosis apparatus 101 in FIG. 16 includes a simulation DB 141, a correction function generator 142, a corrector 143, an integrator 144, and an integrated DB 145, in addition to the elements in FIG. 2. The pair of the correction function generator 142 and the corrector 143 corresponds to a correction processor 146.

The simulation DB 141 stores simulation data generated by preliminarily performed simulation of the generation capacity of each PCS. For example, the simulation DB 141 stores simulation data on each PCS on each date. A simulation executor that executes simulation may be added to the anomaly factor diagnosis apparatus in FIG. 16.

Specifically, the simulation DB 141 stores estimation data on measured values at the same time point on the same date as the measurement data, as simulation data (hereinafter called first simulation data). Here, for example, the first simulation data on the time point and date identical to those of the measurement data at least with occurrence of no anomaly factor (negative-example data) is stored. Note that the first simulation data on the time point and date identical to those of measurement data with anomaly factor occurrence (positive-example data) may be stored. The measurement DB 111 stores other positive- and negative-example simulation data (hereinafter called second simulation data) in a case of simulation of the generation capacity with the date, time slot, and failure factor being variously changed. The second simulation data may have no time point item. Any time point may be set. Any time point may be a future time point or a past time point after or before the time point of the measurement data. Any time point may be a virtual time point (as long as it is a time point allowing the second simulation data to be distinguished). Hereinafter, the case where any time point is set in the second simulation data is assumed. The time point of anomaly factor occurrence in the simulation corresponds to a third time point according to this embodiment. For example, if no or a small number of positive-example measurement data items is present, the positive-example second simulation data can be utilized for generating the positive-example feature distribution. The first simulation data, if it is associated with the measurement data at the same time point, may not necessarily have the time point item. In the following description, the case where the time point identical to that of the corresponding measurement data is set in the first simulation data is assumed. The items of the first and second simulation data may be the same as those of the measurement data in FIG. 3 according to the first embodiment. Some items (voltage, current, etc.) may be omitted. Additional items may be present. In the following description, description is made assuming a case of one type of the anomaly factor (for example, a rod-shaped shadow, array contamination, etc.). In a case of two or more types, the processing may be performed independently with respect to each type of the anomaly factors, as in the first embodiment.

The anomaly factor occurrence DB 116 stores a flag representing presence or absence of the anomaly factor, at least on each day or each time point of generation of the second simulation data, in association with "PCS_ID", date or time point. The presence or absence of the anomaly factor on each day or each time point is predetermined at the time of simulation. Here, the flag is set in a unit of day or a unit of time point. Alternatively, the flag may be set in a unit of evaluation time slot or a unit of unit time slot.

FIG. 17 shows an example of the anomaly factor occurrence DB 116. For the time point (any time point) of the second simulation data, the flag representing presence or absence of anomaly factor is stored. Any time point is represented by "STP00001", "STP00002", etc. The time point item is not necessarily provided if there is association with the second simulation data. As in the first embodiment, the anomaly factor occurrence DB 116 also stores the anomaly factor occurrence data with respect to the actual measurement data (see FIG. 4).

The correction function generator 142 generates a correction function for correcting the value of the simulation data, for each PCS, on the basis of the negative-example (absence of anomaly) actual measurement data and the negative-example (absence of anomaly) first simulation data. Hereinafter, generation of the correction function is described in detail.

The correction function generator 142 associates the negative-example actual measurement data (measurement data) at the same time point with the negative-example first simulation data, and generates a pair of these data items at the same time point.

Figure 18:
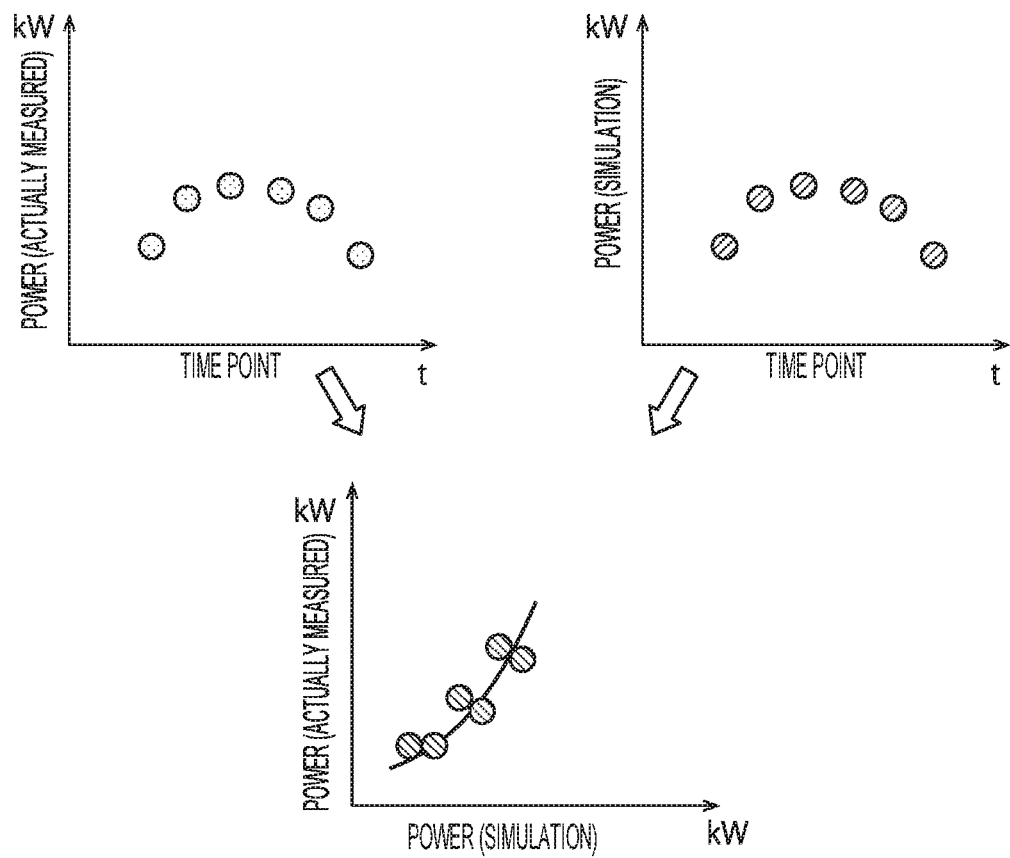
FIG. 18 shows an example of associating actual measurement data and simulation data with each other.

FIG. 18 shows an example of associating the actual measurement data and the first simulation data with each other. An upper left part of FIG. 18 schematically shows an example where measurement data items are plotted on a coordinate system with an abscissa axis indicating the time point and an ordinate axis indicating the power value. An upper right part of FIG. 18 schematically shows an example where the first simulation data items are plotted on a coordinate system with an abscissa axis indicating the time point and an ordinate axis indicating the power value. Based on the measurement data in the upper left part of FIG. 18 and the first simulation data items in the upper right part of FIG. 18, the actual measurement data items and the first simulation data items at the same time point are associated with each other. The pairs of these data items are plotted on a coordinate system with an abscissa axis indicating the power value of the simulation and an ordinate axis indicating the actually measured power value. A lower part of FIG. 18 schematically shows an example where these pairs are plotted.

If the measurement time interval and the simulation time interval coincide with each other, the actual measurement data and the first simulation data may be associated with each other at each identical time interval. If the time intervals are different from each other, for example, if the actual measurement is at a one-minute interval and the simulation is at a 60-minute interval, the association is as follows. That is, the 60-minute representative value (for example, the average) of the actual measurement data is calculated every 60 minutes, and the pair of the calculated value and the value of the first simulation data are associated as data at the same time point.

The correction function generator 142 generates a correction function for correcting the value of the simulation data (for example, the power value) so as to minimize the difference between the associated value of the measurement data and the value of the first simulation data. For example, as a function having the value of the simulation data adopted as the input variable and the value subjected to correction (corrected value) adopted as the output variable, for example, $y=f(x)+\varepsilon$ is set. "x" is an input variable, and "y" is an output variable. The value of negative-example measurement data is used as the teaching data for the output variable, and the parameter of "f(x)" and "ε" are estimated by an optimization method, such as the least-squares method, so as to minimize the difference between "x" and "y". "f(x)" may be a linear function, a quadratic function, or other type of function. The correction function generator 142 transmits the generated correction function to the corrector 143. The correction function generator 142 may store the generated correction function in a storage device accessible from the corrector 143. In this case, the corrector 143 may read the correction function from the storage device.

For example, a value different from the voltage value, such as of DC voltage, DC current, air temperature, may be used as the input variable of "f(x)", and the corrected power value may be adopted as the output variable. If the input variable does not include the power value, adoption of a value dependent on the power value as the input variable allows the corrected power value to be obtained. A function of correcting the item, such as the current, voltage, or air temperature, may be generated, and such items may be adopted as correction targets.

The corrector 143 uses the correction function to correct the values of the positive- and negative-example second simulation data (for example, the power values). That is, the values of the positive- and negative-example second simulation data are adopted as the input variable x, the correction function is calculated, and the output variable y is obtained. The value of y is the corrected value of the second simulation data. The correction is performed on each PCS using the corresponding correction function. The corrector 143 may store the corrected value of the positive- and negative-example second simulation data, in the DB.

Execution of this correction process can generate many incidents of the generated power even in a PV plant having a small number of failure incidents in actuality. That is, even for a PV plant having a small number of failure incidents, the feature distribution of the positive-example (presence of anomaly) can be generated.

The integrator 144 integrates the measurement data in the measurement DB 111, and the corrected second simulation data, and stores the integrated data in the integrated DB 145. The data in the integrated DB 145 may be displayed on the display device 131, and allow the user to verify the result of correction of the second simulation data. For example, the corrected second simulation data is added to the end of the measurement data group in the measurement DB 111, and the data group after the addition is stored in the integrated DB 145. If there is an item not to be used in processes thereafter, such as an item of current or voltage, this item may be removed.

FIG. 19 shows an example of the integrated DB 145. The integrated DB 145 stores the measurement data (actual measurement data) and the corrected second simulation data. The value of the second simulation data having not been corrected may further be stored. In this example, the values of voltage and current are not stored as the items of the simulation data. Alternatively, the corrected values of voltage and current may be stored.

According to a modification example, the corrector 143 may correct not only the second simulation data but also the first simulation data, and also add the corrected first simulation data to the integrator 144. The user may also be allowed to verify the result of correction of the first simulation data.

According to another modification example, if there are sufficient negative-example measurement data items, only the positive-example second simulation data may be generated in simulation.

The identifier 112, the feature distribution generator 113, the score calculator 114, and the evaluation value calculator 115 may perform processes similar to those in the first embodiment using the integrated DB 145 instead of the measurement DB 111 in the first embodiment. In this case, to generate the positive-example feature distribution, for example, the positive-example second simulation data can be used. If the positive-example measurement data is present, the positive-example measurement data can also be used. To generate the negative-example feature distribution, for example, at least one of the negative-example measurement data and the negative-example second simulation data can be used.

The user may designate simulation conditions, and the simulation data to be used for the simulation may be selected according to the conditions designated by the user.

FIG. 20 shows an example of a user interface screen allowing the user to designate the simulation data selection conditions. This apparatus displays this screen on the display device 131, and the user inputs conditions through the input device 121. In the illustrated example, Jul. 1, 2018 to Aug. 31, 2018 is designated as a simulation target period, and 44 to 54 degrees are designated as the simulation target culmination altitude. The simulation target period includes, for example, a date identical to that of the measurement data, and a date that is absent in the measurement data. 60 minutes is designated as the unit time interval, and 10:00 to 16:00 is designated as the evaluation time slot. The unit time interval and the evaluation time slot may be applied to the processes in the feature distribution generator 113 and thereafter. The presence or absence of using the simulation data can also be designated. Conditions of items other than those indicated in FIG. 20 may also be designated.

The correction function generator 142 operates to select, from the simulation DB 141, the simulation data satisfying the conditions designated by the user through the user interface screen in FIG. 20. If the user designates use of the simulation data, the process in the correction processor is performed according to the embodiment described above. On the other hand, if the user does not designate the use of the simulation data, the process in the correction processor is not performed. That is, in this case the operations of the first embodiment are performed without using the simulation data. If the information on the presence or absence of occurrence of the anomaly factor is sufficiently obtained with respect to the actual measurement data, an analysis result in which the actual installation environment of the PV panel is reflected can be obtained, by not using the simulation data. If a certain time period is required to accumulate the positive-example actual measurement data, the simulation data is used until a certain number of positive-example actual measurement data items are accumulated, and after this number of positive-example actual measurement data items are accumulated, it may be switched to the database of the actual measurement data. Accordingly, the analysis result can temporarily be obtained at high speed using the simulation until the positive-example actual measurement data items are accumulated, and after the positive-example actual measurement data items are accumulated, an analysis result in conformity with the actual installation environment can be obtained by switching the database to be used to an actual measurement data database.

According to a modification example, presence or absence of creation of the correction function may be designated by the user. If the presence of creation of the correction function is designated by the user, the correction function generator 142 generates the correction function. If the absence of creation of the correction function is designated by the user, the correction function generator 142 generates no correction function. In this case, the corrector 143 corrects the simulation data using the correction function created previously (last time, for example). The correction function is not generated every time, thus allowing the process to be efficient.

The user interface screen in FIG. 20, and the user interface screen (see FIG. 13) for designating the conditions in the first embodiment may be integrated into one.

FIG. 21 shows an example where these user interface screens are integrated into one. The user may input conditions through the integrated user interface screen. Alternatively, this apparatus may present the screens in FIGS. 13 and 16 separately, and allow the user to input conditions separately. As for the items common to both the screens, such as the unit time interval and the evaluation time slot, an input result into one user interface screen may be automatically reflected in the other user interface screen.

Figure 22:
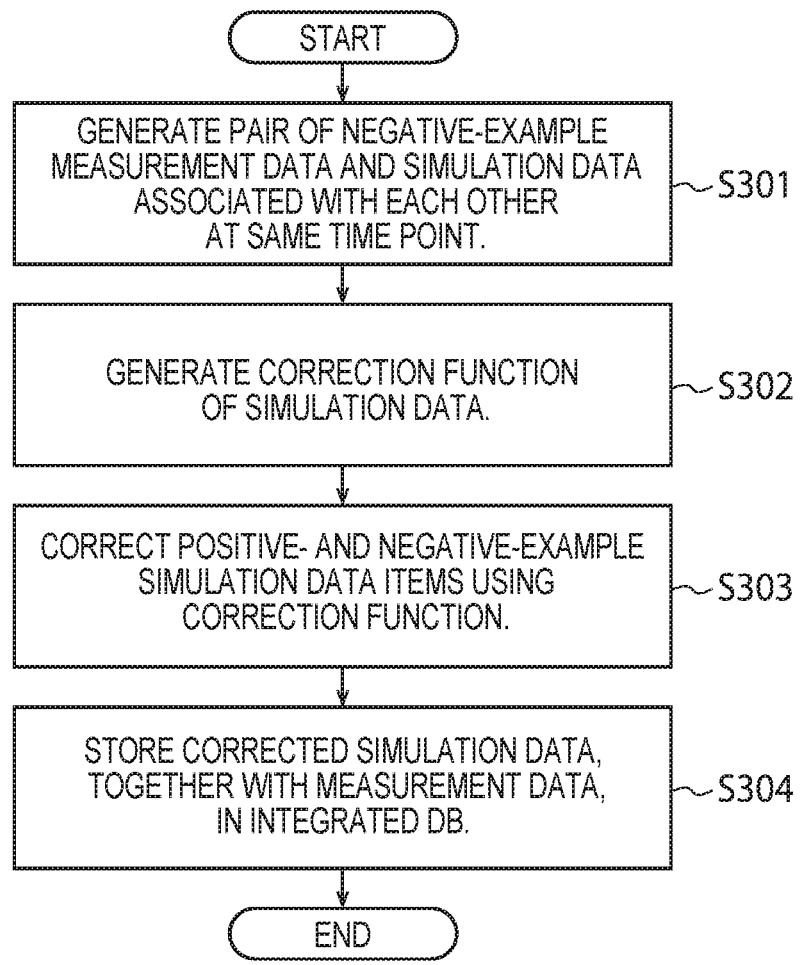
FIG. 22 is a flowchart of processes pertaining to a correction function generator, a corrector, and an integrator according to the second embodiment.

FIG. 22 is a flowchart of processes pertaining to the correction function generator 142, the corrector 143 and the integrator 144.

In step S301, the correction function generator 142 associates the negative-example measurement data at the same time point with the negative-example simulation data (first simulation data), and generates a pair of these data items at the same time point.

In step S302, the correction function generator 142 estimates parameters of the correction function having the value of the simulation data as the input variable and the corrected value as the output variable, on the basis of the pair of data items generated in step S301. The parameters of the correction function are obtained such that for example, the value of the measurement data is used as the teaching data, and the difference between the value of the measurement data and the value of the simulation data is minimized.

In step S303, the corrector 143 corrects the positive- and negative-example simulation data items (second simulation data) using the correction function generated in step S302.

In step S304, the integrator 144 stores the corrected second simulation data, together with the measurement data in the measurement DB 111, in the integrated DB. The processes thereafter are similar to those in the first embodiment.

Figure 23:
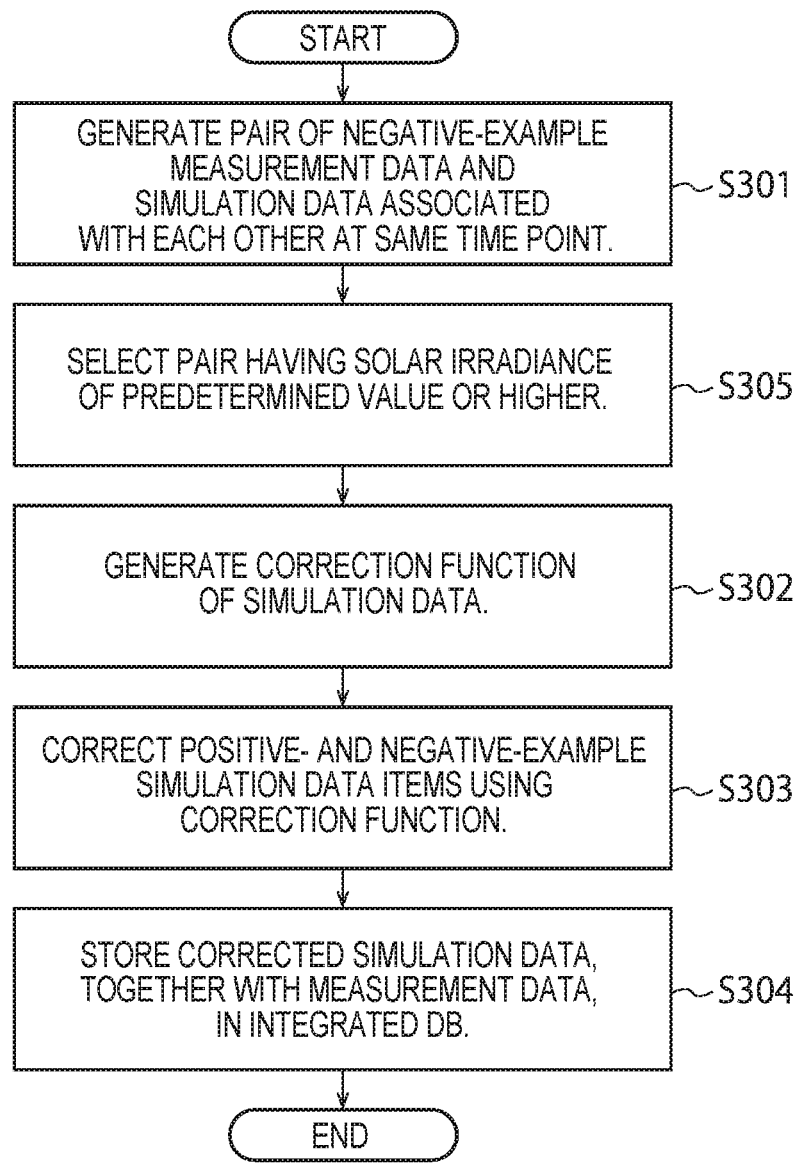
FIG. 23 is a flowchart of another example of processes pertaining to the correction function generator, the corrector, and the integrator according to the second embodiment.

FIG. 23 is a flowchart of processes obtained by adding step S305 to the flowchart of FIG. 22. Step S305 is added between steps S301 and S302. In step S305, the correction function generator 142 selects the pair of data items having the solar irradiance of the measurement data equal to or higher than a predetermined value (for example, 0.7) from among the pairs of data items generated in step S301. In step S302, the pair of data items selected in step S305 is used to generate the correction function (to estimate the parameters of the correction function). Here, the pair of data items is selected according to the condition of solar irradiance. Alternatively, the range of the measurement time point (for example, from 10 o'clock to 16 o'clock) may be designated, and the pair of data items including the measurement data belonging to this range may be selected. The designated range of the measurement time point may be the evaluation time slot.

Figure 24:
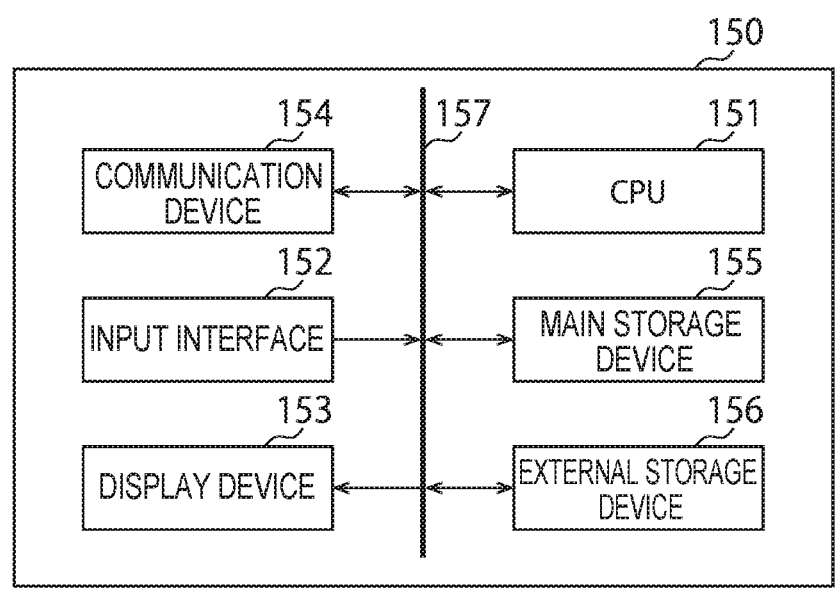
FIG. 24 shows a hardware configuration example of the anomaly factor diagnosis apparatus according to the embodiment of the present invention.

FIG. 24 shows a hardware configuration example of the anomaly factor diagnosis apparatus according to the embodiment of the present invention. The hardware configuration in FIG. 24 is configured as a computer 150. The computer 150 includes a CPU 151, an input interface 152, a display device 153, a communication device 154, a main storage device 155, and an external storage device 156, which are communicably connected to each other via a bus 157.

The input interface 152 corresponds to the input device 121. The display device 153 corresponds to the display device 131. The communication device 154 includes a wireless or wired communication scheme, and wiredly or wirelessly communicates with each PCS. The measurement data may be acquired via the communication device 154. The input interface 152 and the communication device 154 may include circuits, such as integrated circuits, which are separated from each other, or may include a single circuit, such as an integrated circuit.

The external storage device 156 includes, for example, a storage medium such as an HDD, an SSD, a memory device, a CD-R, a CD-RW, a DVD-RAM, or a DVD-R. The external storage device 156 stores programs for causing the CPU 151 as a processor to execute the functions of the processors of the anomaly factor diagnosis apparatus. The various DBs included in the anomaly factor diagnosis apparatus are also included in the external storage device 156. Here, only one external storage device 156 is shown. Alternatively, multiple devices may be present.

Under control by the CPU 151, the main storage device 155 deploys the control programs stored in the external storage device 156, and stores data required to execute the programs, and data or the like caused by execution of the programs. The main storage device 155 includes any memory or storage, such as a volatile memory (DRAM, SRAM, etc.) or a nonvolatile memory (NAND flash memory, MRAM, etc.), for example. Execution of the control programs deployed in the main storage device 155 by the CPU 151 executes the functions of the processors of the anomaly factor diagnosis apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An anomaly factor diagnosis apparatus, comprising: a database including
measurement data items for a plurality of days, the measurement data items each including generated power and solar irradiances as measured values related to a power generation apparatus wherein the day includes a plurality of unit time slots, and
anomaly factor occurrence data including whether or not an anomaly factor occurs for the power generation apparatus for each of the days;
an identifier configured to identify first measurement data items for one or more days on which the anomaly factor occurred, and second measurement data items for one or more days on which the anomaly factor does not occur;
a distribution generator configured to
specify a maximum value of values of the generated power divided by the solar irradiance for a pair of the first and second measurement data belonging to the unit time slot for each unit time slot, and
calculate a first distribution function for each unit time slot representing a distribution of feature values related to generated power, the feature values being ratios between the maximum value divided by the solar irradiance and the generated power divided by the solar irradiance based on the first measurement data items for each unit time slot, an input variable of the first distribution function being the feature value and an output variable of the first distribution being a probability, and
calculate a second distribution function for each unit time slot representing a distribution of feature values related to generated power, the feature values being ratios between the maximum value divided by the solar irradiance and the generated power divided by the solar irradiance based on the second measurement data items for each unit time slot;
an evaluator configured to
determine whether a pair of the first distribution function and the second distribution function satisfies a separation condition that the first distribution function and the second distribution function are separate from each other for each unit time slot to identify one or more unit time slots that satisfies the separation condition,
identify a first percent point in an upper side of the first distribution function and a second percent point in a lower side of the second distribution function, detects whether an interval between the first percent point and the second percent point contains at least one of respective peaks of the first distribution function and the second distribution function, and determines that the separation condition is satisfied only when none of the peaks belong to the interval,
acquire a target measurement data item to be tested on a day which includes measured values related to the power generation apparatus, the target measurement data item including the generated power and the solar irradiances as the measured values and the day including the plurality of unit time slots,
obtain a feature value related to generated power based on the target measurement data for each of the identified unit time slots, the feature value related to generated power based on the target measurement data being a ratio between the maximum value divided by the solar irradiance and the generated power divided by the solar irradiance based on the target measurement data for each of the identified unit time slots,
calculate a score for each of the identified unit time slots, which is a ratio between the feature value calculated for each of the identified unit time slots and a maximum output value of the first distribution function corresponding to each of the identified unit time slots, and
average the score across the identified unit time periods to obtain an evaluation value indicating a possibility of occurrence of the anomaly factor in the power generation apparatus; and
an output device configured to output information indicative of whether the anomaly factor occurs for the power generation apparatus based on the evaluation value.

2. The anomaly factor diagnosis apparatus according to claim 1, further comprising:
a storage configured to store simulation data items on power generation of the power generation apparatus for a plurality of days; and
a correction processor configured to
generate, based on the second measurement data item and the simulation data on a day on which the anomaly factor does not occur, a correction function of the simulation data item to reduce a difference between the simulation data item and the second measurement data item, and
correct the simulation data item on a day when the anomaly factor occurs at least in simulation for the power generation apparatus, based on the correction function, and
the distribution generator generates the first distribution function for each unit time slot, based on feature values for each unit time slot calculated from the corrected simulation data item.

3. The anomaly factor diagnosis apparatus according to claim 2,
wherein the correction processor identifies the simulation data item satisfying a condition of at least one of a solar irradiance, a time point, a culmination altitude, and a generated power among the simulation data items for days on which the anomaly factor does not occur, and generates the correction function based on the identified simulation data item.

4. The anomaly factor diagnosis apparatus according to claim 2,
wherein the apparatus receives instruction data by a user from a user interface, performs a process of the correction processor when the instruction data indicates to use the simulation data items, and does not perform the process of the correction processor when the instruction data does not indicate to use the simulation data items.

5. The anomaly factor diagnosis apparatus according to claim 2, further comprising
the output device generating output information for displaying the simulation data item corrected by the correction processor.

6. The anomaly factor diagnosis apparatus according to claim 5, further comprising
a display device configured to display the output information.

7. The anomaly factor diagnosis apparatus according to claim 1,
wherein the identifier identifies the first measurement data items satisfying a condition of at least one of a solar irradiance, a time point, a culmination altitude, and generated power, and
the distribution generator generates the first distribution function, based on the identified first measurement data items.

8. The anomaly factor diagnosis apparatus according to claim 1, wherein
the evaluator calculates the evaluation value, for each of a plurality of the power generation apparatuses or for each of a plurality of days to be simulated, and
the output device generates output information for displaying the evaluation values sorted in a descending order or an ascending order.

9. The anomaly factor diagnosis apparatus according to claim 1, wherein
the first distribution function and the second distribution function are each a normal distribution.

10. The anomaly factor diagnosis apparatus according to claim 1, wherein
the output device compares the evaluation value with a threshold to determine whether the anomaly factor occurs for the power generation apparatus.

11. The anomaly factor diagnosis apparatus according to claim 1, wherein
the anomaly factor includes at least one of a shadow casted on a PV panel or a contamination of a PV panel.

12. An anomaly factor diagnosis method, comprising:
providing a database including
measurement data items for a plurality of days, the measurement data items each including generated power and solar irradiances as measured values related to a power generation apparatus wherein the day includes a plurality of unit time slots and
anomaly factor occurrence data including whether an anomaly factor occur for the power generation apparatus for each of the days;
identifying first measurement data items for one or more days on which the anomaly factor occurred, and second measurement data items for one or more days on which the anomaly factor does not occur;
specifying a maximum value of values of the generated power divided by the solar irradiance for a pair of the first and second measurement data belonging to the unit time slot for each unit time slot;
calculating a first distribution function for each unit time slot representing a distribution of feature values related to generated power, the feature values being ratios between the maximum value divided by the solar irradiance and the generated power divided by the solar irradiance based on the first measurement data items for each unit time slot, an input variable of the first distribution function being the feature value and an output variable of the first distribution being a probability, and calculate a second distribution function for each unit time slot representing a distribution of feature values related to generated power, the feature values being ratios between the maximum value divided by the solar irradiance and the generated power divided by the solar irradiance based on the second measurement data items for each unit time slot;
determining whether a pair of the first distribution function and the second distribution function satisfies a separation condition that the first distribution function and the second distribution function are separate from each other for each unit time slot to identify one or more unit time slots that satisfies the separation condition, wherein the determining includes identifies a first percent point in an upper side of the first distribution function and a second percent point in a lower side of the second distribution function, detecting whether an interval between the first percent point and the second percent point contains at least one of respective peaks of the first distribution function and the second distribution function, and determining that the separation condition is satisfied only when none of the peaks belong to the interval;
acquiring a target measurement data item to be tested on a day which includes measured values related to the power generation apparatus, the target measurement data item including the generated power and the solar irradiances as the measured values and the day including the plurality of unit time slots;
obtaining a feature value related to generated power based on the target measurement data for each of the identified unit time slots, the feature value related to generated power based on the target measurement data being a ratio between the maximum value divided by the solar irradiance and the generated power divided by the solar irradiance based on the target measurement data for each of the identified unit time slots;
calculating a score for each of the identified unit time slots, which is a ratio between the feature value calculated for each of the identified unit time slots and a maximum output value of the first distribution function corresponding to each of the identified unit time slots;
averaging the score across the identified unit time periods to obtain an evaluation value indicating possibility of occurrence of the anomaly factor in the power generation apparatus; and
outputting information indicative of whether the anomaly factor occurs for the power generation apparatus based on the evaluation value.

13. An anomaly factor diagnosis system comprising:
at least one power generation apparatus; and
an anomaly factor diagnosis apparatus provided for the at least one power generation apparatus, wherein
the anomaly factor diagnosis apparatus comprises:
a database including
measurement data items for a plurality of days, the measurement data items each including generated power and solar irradiances as measured values related to the power generation apparatus wherein the day includes a plurality of unit time slots; and
anomaly factor occurrence data including whether an anomaly factor occur for the power generation apparatus for each of the days;
an identifier configured to identify first measurement data items for one or more days on which the anomaly factor occurred, and second measurement data items for one or more days on which the anomaly factor does not occur;
a distribution generator configured to
specify a maximum value of values of the generated power divided by the solar irradiance for a pair of the first and second measurement data belonging to the unit time slot for each unit time slot, and calculate a first distribution function for each unit time slot representing a distribution of feature values related to generated power, the feature values being ratios between the maximum value divided by the solar irradiance and the generated power divided by the solar irradiance based on the first measurement data items for each unit time slot, an input variable of the first distribution function being the feature value and an output variable of the first distribution being a probability, and calculate a second distribution function for each unit time slot representing a distribution of feature values related to generated power, the feature values being ratios between the maximum value divided by the solar irradiance and the generated power divided by the solar irradiance based on the second measurement data items for each unit time slot;

an evaluator configured to determine whether a pair of the first distribution function and the second distribution function satisfies a separation condition that the first distribution function and the second distribution function are separate from each other for each unit time slot to identify one or more unit time slots that satisfies the separation condition, identify a first percent point in an upper side of the first distribution function and a second percent point in a lower side of the second distribution function, detects whether an interval between the first percent point and the second percent point contains at least one of respective peaks of the first distribution function and the second distribution function, and determines that the separation condition is satisfied only when none of the peaks belong to the interval, acquire a target measurement data item to be tested on a day which includes measured values related to the power generation apparatus, the target measurement data item including the generated power and the solar irradiances as the measured values and the day including the plurality of unit time slots, obtain a feature value related to generated power based on the target measurement data for each of the identified unit time slots, the feature value related to generated power based on the target measurement data being a ratio between the maximum value divided by the solar irradiance and the generated power divided by the solar irradiance based on the target measurement data for each of the identified unit time slots, calculate a score for each of the identified unit time slots, which is a ratio between the feature value calculated for each of the identified unit time slots and a maximum output value of the first distribution function corresponding to each of the identified unit time slots, and average the score across the identified unit time periods to obtain an evaluation value indicating possibility of occurrence of the anomaly factor in the power generation apparatus; and an output device configured to output information indicative of whether the anomaly factor occurs for the power generation apparatus based on the evaluation value.

* * * * *